United States Patent
Corcoran et al.

(10) Patent No.: US 8,355,545 B2
(45) Date of Patent: *Jan. 15, 2013

(54) BIOMETRIC DETECTION USING SPATIAL, TEMPORAL, AND/OR SPECTRAL TECHNIQUES

(75) Inventors: Stephen P. Corcoran, Corrales, NM (US); Robert K. Rowe, Corrales, NM (US); Ryan Martin, Tijeras, NM (US)

(73) Assignee: Lumidigm, Inc., Albuquerque, NM (US)

( * ) Notice: Subject to any disclaimer, the term of this patent is extended or adjusted under 35 U.S.C. 154(b) by 1082 days.

This patent is subject to a terminal disclaimer.

(21) Appl. No.: 12/100,597

(22) Filed: Apr. 10, 2008

(65) Prior Publication Data

US 2009/0046903 A1 Feb. 19, 2009

Related U.S. Application Data

(60) Provisional application No. 60/911,007, filed on Apr. 10, 2007.

(51) Int. Cl.
*G06K 9/00* (2006.01)
(52) U.S. Cl. ................................................ 382/124
(58) Field of Classification Search .............. 382/124; 340/5.53, 5.83
See application file for complete search history.

(56) References Cited

U.S. PATENT DOCUMENTS

| | | | |
|---|---|---|---|
| 3,508,830 A | 4/1970 | Hopkins et al. | |
| 3,619,060 A | 11/1971 | Johnson | |
| 3,854,319 A | 12/1974 | Burroughs et al. | |
| 3,872,443 A | 3/1975 | Ott | |
| 3,910,701 A | 10/1975 | Henderson et al. | |
| RE29,008 E | 10/1976 | Ott | |
| 4,035,083 A | 7/1977 | Woodriff et al. | |
| 4,142,797 A | 3/1979 | Astheimer | |
| 4,169,676 A | 10/1979 | Kaiser | |
| 4,170,987 A | 10/1979 | Anselmo et al. | |
| 4,260,220 A | 4/1981 | Whitehead | |

(Continued)

FOREIGN PATENT DOCUMENTS

CN 1307711 A 8/2001

(Continued)

OTHER PUBLICATIONS

Chinese Patent Application No. 2006/80038597.4, First Office Action mailed on Mar. 23, 2011, 7 pages.

(Continued)

*Primary Examiner* — John Strege
(74) *Attorney, Agent, or Firm* — Marsh Fischmann & Breyfogle LLP

(57) ABSTRACT

A biometric feature detection system is provided according to one embodiment. The system may include a target, an illumination source, a color filter array, a light detector, and a computational unit. The illumination source illuminates a portion of the target with monochromatic light at a large angle of incidence measured from the normal of the target surface. The light detector may be configured to receive light from the target through the color-filter array and provide an image of the target surface. Each pixel of the light detector may correspond to one of a plurality of color filter mosaics such that each pixel detects light associated with a corresponding color filter. The computational unit may be interfaced with at least the light detector. The computational unit may include instructions to monitor the levels of monochromatic light and make proximity, presence and segmentation determinations based on the detected levels of monochromatic light.

32 Claims, 21 Drawing Sheets

U.S. PATENT DOCUMENTS

| | | |
|---|---|---|
| 4,322,163 A | 3/1982 | Schiller |
| 4,427,889 A | 1/1984 | Muller |
| 4,537,484 A | 8/1985 | Fowler |
| 4,598,715 A | 7/1986 | Machler et al. |
| 4,653,880 A | 3/1987 | Sting et al. |
| 4,654,530 A | 3/1987 | Dybwad |
| 4,655,225 A | 4/1987 | Dahne et al. |
| 4,656,562 A | 4/1987 | Sugino |
| 4,657,397 A | 4/1987 | Oehler et al. |
| 4,661,706 A | 4/1987 | Messerschmidt et al. |
| 4,684,255 A | 8/1987 | Ford |
| 4,699,149 A | 10/1987 | Rice |
| 4,712,912 A | 12/1987 | Messerschmidt |
| 4,730,882 A | 3/1988 | Messerschmidt |
| 4,747,147 A | 5/1988 | Sparrow |
| 4,787,013 A | 11/1988 | Sugino et al. |
| 4,787,708 A | 11/1988 | Whitehead |
| 4,830,496 A | 5/1989 | Young |
| 4,853,542 A | 8/1989 | Milosevic et al. |
| 4,857,735 A | 8/1989 | Noller |
| 4,859,064 A | 8/1989 | Messerschmidt et al. |
| 4,866,644 A | 9/1989 | Shenk et al. |
| 4,867,557 A | 9/1989 | Takatani et al. |
| 4,882,492 A | 11/1989 | Schlager |
| 4,883,953 A | 11/1989 | Koashi et al. |
| 4,936,680 A | 6/1990 | Henkes et al. |
| 4,937,764 A | 6/1990 | Komatsu et al. |
| 4,944,021 A | 7/1990 | Hoshino et al. |
| 4,975,581 A | 12/1990 | Robinson et al. |
| 5,015,100 A | 5/1991 | Doyle |
| 5,019,715 A | 5/1991 | Sting et al. |
| 5,028,787 A | 7/1991 | Rosenthal et al. |
| 5,051,602 A | 9/1991 | Sting et al. |
| 5,055,658 A | 10/1991 | Cockburn |
| 5,068,536 A | 11/1991 | Rosenthal |
| 5,070,874 A | 12/1991 | Barnes et al. |
| 5,077,803 A | 12/1991 | Kato et al. |
| 5,088,817 A | 2/1992 | Igaki et al. |
| 5,109,428 A | 4/1992 | Igaki et al. |
| 5,146,102 A | 9/1992 | Higuchi et al. |
| 5,158,082 A | 10/1992 | Jones |
| 5,163,094 A | 11/1992 | Prokoski et al. |
| 5,177,802 A | 1/1993 | Fujimoto et al. |
| 5,178,142 A | 1/1993 | Harjunmaa et al. |
| 5,179,951 A | 1/1993 | Knudson |
| 5,204,532 A | 4/1993 | Rosenthal |
| 5,222,495 A | 6/1993 | Clarke et al. |
| 5,222,496 A | 6/1993 | Clarke et al. |
| 5,223,715 A | 6/1993 | Taylor |
| 5,225,678 A | 7/1993 | Messerschmidt |
| 5,230,702 A | 7/1993 | Lindsay et al. |
| 5,237,178 A | 8/1993 | Rosenthal et al. |
| 5,243,546 A | 9/1993 | Maggard |
| 5,257,086 A | 10/1993 | Fateley et al. |
| 5,258,922 A | 11/1993 | Grill |
| 5,267,152 A | 11/1993 | Yang et al. |
| 5,268,749 A | 12/1993 | Weber et al. |
| 5,291,560 A | 3/1994 | Daugman |
| 5,299,570 A | 4/1994 | Hatschek |
| 5,303,026 A | 4/1994 | Strobl et al. |
| 5,311,021 A | 5/1994 | Messerschmidt |
| 5,313,941 A | 5/1994 | Braig et al. |
| 5,321,265 A | 6/1994 | Block |
| 5,331,958 A | 7/1994 | Oppenheimer |
| 5,335,288 A | 8/1994 | Faulkner |
| 5,348,003 A | 9/1994 | Caro |
| 5,351,686 A | 10/1994 | Steuer et al. |
| 5,355,880 A | 10/1994 | Thomas et al. |
| 5,360,004 A | 11/1994 | Purdy et al. |
| 5,361,758 A | 11/1994 | Hall et al. |
| 5,366,903 A | 11/1994 | Lundsgaard et al. |
| 5,372,135 A | 12/1994 | Mendelson et al. |
| 5,379,764 A | 1/1995 | Barnes et al. |
| 5,402,778 A | 4/1995 | Chance |
| 5,405,315 A | 4/1995 | Khuri et al. |
| 5,413,098 A | 5/1995 | Benaron et al. |
| 5,419,321 A | 5/1995 | Evans |
| 5,435,309 A | 7/1995 | Thomas et al. |
| 5,441,053 A | 8/1995 | Lodder et al. |
| 5,452,723 A | 9/1995 | Wu et al. |
| 5,459,317 A | 10/1995 | Small et al. |
| 5,459,677 A | 10/1995 | Kowalski et al. |
| 5,460,177 A | 10/1995 | Purdy et al. |
| 5,483,335 A | 1/1996 | Tobias |
| 5,494,032 A | 2/1996 | Robinson et al. |
| 5,505,726 A | 4/1996 | Meserol |
| 5,507,723 A | 4/1996 | Keshaviah |
| 5,515,847 A | 5/1996 | Braig et al. |
| 5,518,623 A | 5/1996 | Keshaviah et al. |
| 5,523,054 A | 6/1996 | Switalski et al. |
| 5,533,509 A | 7/1996 | Koashi et al. |
| 5,537,208 A | 7/1996 | Bertram et al. |
| 5,539,207 A | 7/1996 | Wong et al. |
| 5,552,997 A | 9/1996 | Massart |
| 5,559,504 A | 9/1996 | Itsumi et al. |
| 5,568,251 A | 10/1996 | Davies et al. |
| 5,596,992 A | 1/1997 | Haaland et al. |
| 5,606,164 A | 2/1997 | Price et al. |
| 5,613,014 A | 3/1997 | Eshera et al. |
| 5,630,413 A | 5/1997 | Thomas et al. |
| 5,636,633 A | 6/1997 | Messerschmidt et al. |
| 5,655,530 A | 8/1997 | Messerschmidt |
| 5,672,864 A | 9/1997 | Kaplan |
| 5,672,875 A | 9/1997 | Block et al. |
| 5,677,762 A | 10/1997 | Ortyn et al. |
| 5,681,273 A | 10/1997 | Brown |
| 5,708,593 A | 1/1998 | Saby et al. |
| 5,719,399 A | 2/1998 | Alfano et al. |
| 5,719,950 A | 2/1998 | Osten et al. |
| 5,724,268 A | 3/1998 | Sodickson et al. |
| 5,729,619 A | 3/1998 | Puma |
| 5,737,439 A | 4/1998 | Lapsley et al. |
| 5,743,262 A | 4/1998 | Lepper, Jr. et al. |
| 5,747,806 A | 5/1998 | Khalil |
| 5,750,994 A | 5/1998 | Schlager |
| 5,751,835 A | 5/1998 | Topping et al. |
| 5,751,836 A | 5/1998 | Wildes et al. |
| 5,761,330 A | 6/1998 | Stoianov et al. |
| 5,782,755 A | 7/1998 | Chance et al. |
| 5,792,050 A | 8/1998 | Alam et al. |
| 5,792,053 A | 8/1998 | Skladnev et al. |
| 5,793,881 A | 8/1998 | Stiver et al. |
| 5,796,858 A | 8/1998 | Zhou et al. |
| 5,808,739 A | 9/1998 | Turner et al. |
| 5,818,048 A | 10/1998 | Sodickson et al. |
| 5,823,951 A | 10/1998 | Messerschmidt et al. |
| 5,828,066 A | 10/1998 | Messerschmidt |
| 5,830,132 A | 11/1998 | Robinson |
| 5,830,133 A | 11/1998 | Osten et al. |
| 5,850,623 A | 12/1998 | Carman, Jr. et al. |
| 5,853,370 A | 12/1998 | Chance et al. |
| 5,857,462 A | 1/1999 | Thomas et al. |
| 5,859,420 A | 1/1999 | Borza |
| 5,860,421 A | 1/1999 | Eppstein et al. |
| 5,867,265 A | 2/1999 | Thomas |
| 5,886,347 A | 3/1999 | Inoue et al. |
| 5,902,033 A | 5/1999 | Levis et al. |
| 5,914,780 A | 6/1999 | Turner et al. |
| 5,929,443 A | 7/1999 | Alfano et al. |
| 5,933,792 A | 8/1999 | Andersen et al. |
| 5,935,062 A | 8/1999 | Messerschmidt et al. |
| 5,945,676 A | 8/1999 | Khalil |
| 5,949,543 A | 9/1999 | Bleier et al. |
| 5,957,841 A | 9/1999 | Maruo et al. |
| 5,961,449 A | 10/1999 | Toida et al. |
| 5,963,319 A | 10/1999 | Jarvis et al. |
| 5,978,495 A | 11/1999 | Thomopoulos et al. |
| 5,987,346 A | 11/1999 | Benaron et al. |
| 5,999,637 A | 12/1999 | Toyoda et al. |
| 6,005,722 A | 12/1999 | Butterworth et al. |
| 6,016,435 A | 1/2000 | Maruo et al. |
| 6,025,597 A | 2/2000 | Sterling et al. |
| 6,026,314 A | 2/2000 | Amerov et al. |
| 6,028,773 A | 2/2000 | Hundt |
| 6,031,609 A | 2/2000 | Funk et al. |
| 6,034,370 A | 3/2000 | Messerschmidt |
| 6,040,578 A | 3/2000 | Malin et al. |

| | | | | | | |
|---|---|---|---|---|---|---|
| 6,041,247 | A | 3/2000 | Weckstrom et al. | 6,853,444 B2 | 2/2005 | Haddad |
| 6,041,410 | A | 3/2000 | Hsu et al. | 6,898,299 B1 | 5/2005 | Brooks |
| 6,043,492 | A | 3/2000 | Lee et al. | 6,928,181 B2 | 8/2005 | Brooks |
| 6,044,285 | A | 3/2000 | Chaiken et al. | 6,937,885 B1 | 8/2005 | Lewis et al. |
| 6,045,502 | A | 4/2000 | Eppstein et al. | 6,958,194 B1 | 10/2005 | Hopper et al. |
| 6,046,808 | A | 4/2000 | Fateley | 6,995,384 B2 | 2/2006 | Lee et al. |
| 6,049,727 | A | 4/2000 | Crothall | 7,047,419 B2 | 5/2006 | Black |
| 6,056,738 | A | 5/2000 | Marchitto et al. | 7,084,415 B2 * | 8/2006 | Iwai ............................ 250/556 |
| 6,057,925 | A | 5/2000 | Anthon | 7,147,153 B2 | 12/2006 | Rowe et al. |
| 6,061,581 | A | 5/2000 | Alam et al. | 7,254,255 B2 | 8/2007 | Dennis |
| 6,061,582 | A | 5/2000 | Small et al. | 7,263,213 B2 | 8/2007 | Rowe |
| 6,066,847 | A | 5/2000 | Rosenthal | 7,287,013 B2 | 10/2007 | Schneider et al. |
| 6,069,689 | A | 5/2000 | Zeng et al. | 7,347,365 B2 | 3/2008 | Rowe |
| 6,070,093 | A | 5/2000 | Oosta et al. | 7,366,331 B2 | 4/2008 | Higuchi |
| 6,073,037 | A | 6/2000 | Alam et al. | 7,386,152 B2 | 6/2008 | Rowe et al. |
| 6,081,612 | A | 6/2000 | Gutkowicz-Krusin et al. | 7,394,919 B2 | 7/2008 | Rowe et al. |
| 6,088,605 | A | 7/2000 | Griffith et al. | 7,397,943 B2 | 7/2008 | Merbach et al. |
| 6,088,607 | A | 7/2000 | Diab et al. | 7,440,597 B2 | 10/2008 | Rowe |
| 6,097,035 | A | 8/2000 | Belongie et al. | 7,460,696 B2 | 12/2008 | Rowe |
| 6,100,811 | A | 8/2000 | Hsu et al. | 7,508,965 B2 | 3/2009 | Rowe et al. |
| 6,115,484 | A | 9/2000 | Bowker et al. | 7,515,252 B2 | 4/2009 | Hernandez |
| 6,115,673 | A | 9/2000 | Malin et al. | 7,539,330 B2 | 5/2009 | Rowe |
| 6,122,042 | A | 9/2000 | Wunderman et al. | 7,545,963 B2 | 6/2009 | Rowe |
| 6,122,394 | A | 9/2000 | Neukermans et al. | 7,627,151 B2 | 12/2009 | Rowe |
| 6,122,737 | A | 9/2000 | Bjorn et al. | 7,668,350 B2 | 2/2010 | Rowe |
| 6,125,192 | A | 9/2000 | Bjorn et al. | 7,735,729 B2 | 6/2010 | Rowe |
| 6,141,101 | A | 10/2000 | Bleier et al. | 7,751,594 B2 | 7/2010 | Rowe et al. |
| 6,147,749 | A | 11/2000 | Kubo et al. | 7,801,338 B2 | 9/2010 | Rowe |
| 6,148,094 | A | 11/2000 | Kinsella | 7,801,339 B2 | 9/2010 | Sidlauskas et al. |
| 6,152,876 | A | 11/2000 | Robinson et al. | 7,804,984 B2 | 9/2010 | Sidlauskas et al. |
| 6,154,658 | A | 11/2000 | Caci | 7,819,311 B2 | 10/2010 | Rowe et al. |
| 6,157,041 | A | 12/2000 | Thomas et al. | 7,831,072 B2 | 11/2010 | Rowe |
| 6,159,147 | A | 12/2000 | Lichter et al. | 7,835,554 B2 | 11/2010 | Rowe |
| 6,172,743 | B1 | 1/2001 | Kley et al. | 7,899,217 B2 | 3/2011 | Uludag et al. |
| 6,175,407 | B1 | 1/2001 | Sartor | 7,995,808 B2 | 8/2011 | Rowe et al. |
| 6,181,414 | B1 | 1/2001 | Raz et al. | 2002/0009213 A1 | 1/2002 | Rowe et al. |
| 6,181,958 | B1 | 1/2001 | Steuer et al. | 2002/0065468 A1 | 5/2002 | Ultzinger et al. |
| 6,188,781 | B1 | 2/2001 | Brownlee | 2002/0101566 A1 | 8/2002 | Elsner et al. |
| 6,193,153 | B1 | 2/2001 | Lambert | 2002/0111546 A1 | 8/2002 | Cook et al. |
| 6,208,749 | B1 | 3/2001 | Gutkowicz-Krusin | 2002/0138768 A1 | 9/2002 | Murakami et al. |
| 6,212,424 | B1 | 4/2001 | Robinson | 2002/0171834 A1 | 11/2002 | Rowe et al. |
| 6,226,541 | B1 | 5/2001 | Eppstein et al. | 2002/0183624 A1 | 12/2002 | Rowe et al. |
| 6,229,908 | B1 | 5/2001 | Edmonds et al. | 2003/0025897 A1 | 2/2003 | Iwai |
| 6,230,034 | B1 | 5/2001 | Messerschmidt et al. | 2003/0044051 A1 | 3/2003 | Fujieda |
| 6,236,047 | B1 | 5/2001 | Malin et al. | 2003/0078504 A1 | 4/2003 | Rowe |
| 6,240,306 | B1 | 5/2001 | Rohrscheib et al. | 2003/0095525 A1 | 5/2003 | Lavin et al. |
| 6,240,309 | B1 | 5/2001 | Yamashita et al. | 2003/0128867 A1 | 7/2003 | Bennett |
| 6,241,663 | B1 | 6/2001 | Wu et al. | 2003/0163710 A1 | 8/2003 | Ortiz et al. |
| 6,256,523 | B1 | 7/2001 | Diab et al. | 2003/0223621 A1 | 12/2003 | Rowe et al. |
| 6,272,367 | B1 | 8/2001 | Chance | 2004/0003295 A1 | 1/2004 | Elderfield et al. |
| 6,280,381 | B1 | 8/2001 | Malin et al. | 2004/0008875 A1 | 1/2004 | Linares |
| 6,282,303 | B1 | 8/2001 | Brownlee | 2004/0022421 A1 | 2/2004 | Endoh et al. |
| 6,285,895 | B1 | 9/2001 | Ristolainen et al. | 2004/0042642 A1 | 3/2004 | Bolle et al. |
| 6,292,576 | B1 | 9/2001 | Brownlee | 2004/0047493 A1 | 3/2004 | Rowe et al. |
| 6,301,375 | B1 | 10/2001 | Choi | 2004/0114783 A1 | 6/2004 | Spycher et al. |
| 6,301,815 | B1 | 10/2001 | Sliwa | 2004/0120553 A1 | 6/2004 | Stobbe |
| 6,304,767 | B1 | 10/2001 | Soller et al. | 2004/0125994 A1 | 7/2004 | Engels et al. |
| 6,307,633 | B1 | 10/2001 | Mandella et al. | 2004/0179722 A1 | 9/2004 | Moritoki et al. |
| 6,309,884 | B1 | 10/2001 | Cooper et al. | 2004/0240712 A1 | 12/2004 | Rowe et al. |
| 6,317,507 | B1 | 11/2001 | Dolfing et al. | 2004/0240713 A1 | 12/2004 | Hata |
| 6,324,310 | B1 | 11/2001 | Brownlee | 2004/0264742 A1 | 12/2004 | Zhang et al. |
| 6,330,346 | B1 | 12/2001 | Peterson et al. | 2005/0007582 A1 | 1/2005 | Villers et al. |
| 6,404,904 | B1 | 6/2002 | Einighammer et al. | 2005/0125339 A1 | 6/2005 | Tidwell et al. |
| 6,419,361 | B2 | 7/2002 | Cabib et al. | 2005/0169504 A1 | 8/2005 | Black |
| 6,483,929 | B1 | 11/2002 | Murakami et al. | 2005/0180620 A1 | 8/2005 | Takiguchi |
| 6,504,614 | B1 | 1/2003 | Messerschmidt et al. | 2005/0185847 A1 | 8/2005 | Rowe |
| 6,537,225 | B1 | 3/2003 | Mills | 2005/0205667 A1 | 9/2005 | Rowe |
| 6,560,352 | B2 | 5/2003 | Rowe et al. | 2005/0265585 A1 | 12/2005 | Rowe |
| 6,574,490 | B2 | 6/2003 | Abbink et al. | 2005/0265586 A1 | 12/2005 | Rowe et al. |
| 6,597,945 | B2 | 7/2003 | Marksteiner | 2005/0265607 A1 | 12/2005 | Chang |
| 6,606,509 | B2 | 8/2003 | Schmitt | 2005/0271258 A1 | 12/2005 | Rowe |
| 6,628,809 | B1 | 9/2003 | Rowe et al. | 2006/0002597 A1 | 1/2006 | Rowe |
| 6,631,199 | B1 | 10/2003 | Topping et al. | 2006/0002598 A1 | 1/2006 | Rowe et al. |
| 6,741,729 | B2 | 5/2004 | Bjorn et al. | 2006/0045330 A1 * | 3/2006 | Marion ........................ 382/162 |
| 6,749,115 | B2 | 6/2004 | Gressel et al. | 2006/0062438 A1 | 3/2006 | Rowe |
| 6,799,275 | B1 | 9/2004 | Bjorn | 2006/0110015 A1 | 5/2006 | Rowe |
| 6,799,726 | B2 | 10/2004 | Stockhammer | 2006/0115128 A1 | 6/2006 | Mainguet |
| 6,816,605 | B2 | 11/2004 | Rowe et al. | 2006/0171571 A1 | 8/2006 | Chan et al. |
| 6,825,930 | B2 | 11/2004 | Cronin et al. | 2006/0173256 A1 | 8/2006 | Ridder et al. |

| | | | |
|---|---|---|---|
| 2006/0202028 A1 | 9/2006 | Rowe | |
| 2006/0210120 A1 | 9/2006 | Rowe | |
| 2006/0244947 A1 | 11/2006 | Rowe | |
| 2006/0274921 A1 | 12/2006 | Rowe | |
| 2007/0014437 A1 | 1/2007 | Sato | |
| 2007/0030475 A1 | 2/2007 | Rowe et al. | |
| 2007/0052827 A1 | 3/2007 | Hiltunen | |
| 2007/0116331 A1 | 5/2007 | Rowe et al. | |
| 2007/0153258 A1 | 7/2007 | Hernandez | |
| 2007/0165903 A1 | 7/2007 | Munro et al. | |
| 2008/0008359 A1 | 1/2008 | Beenau et al. | |
| 2008/0013806 A1 | 1/2008 | Hamid | |
| 2008/0025579 A1 | 1/2008 | Sidlauskas et al. | |
| 2008/0025580 A1 | 1/2008 | Sidlauskas et al. | |
| 2008/0192988 A1 | 8/2008 | Uludag et al. | |
| 2008/0232653 A1 | 9/2008 | Rowe | |
| 2008/0260211 A1 | 10/2008 | Bennett et al. | |
| 2008/0298649 A1 | 12/2008 | Ennis et al. | |
| 2009/0046903 A1 | 2/2009 | Corcoran et al. | |
| 2009/0080709 A1 | 3/2009 | Rowe et al. | |
| 2009/0092290 A1 | 4/2009 | Rowe | |
| 2009/0148005 A1 | 6/2009 | Rowe | |
| 2009/0245591 A1 | 10/2009 | Rowe et al. | |
| 2010/0067748 A1 | 3/2010 | Rowe | |
| 2010/0246902 A1 | 9/2010 | Rowe et al. | |
| 2011/0085708 A1 | 4/2011 | Martin et al. | |
| 2011/0211055 A1 | 9/2011 | Martin et al. | |
| 2011/0235872 A1 | 9/2011 | Rowe et al. | |

FOREIGN PATENT DOCUMENTS

| | | |
|---|---|---|
| CN | 1402183 A | 3/2003 |
| CN | 1509454 A | 6/2004 |
| DE | 10153808 | 5/2003 |
| EP | 0 280 418 A1 | 8/1988 |
| EP | 0 372 748 | 6/1990 |
| EP | 0 426 358 B1 | 5/1991 |
| EP | 0 449 335 A2 | 10/1991 |
| EP | 0 573 137 A2 | 12/1993 |
| EP | 0 631 137 A2 | 12/1994 |
| EP | 0 670 143 A1 | 9/1995 |
| EP | 0 681 166 A1 | 11/1995 |
| EP | 0 757 243 A1 | 2/1997 |
| EP | 0 788 000 A2 | 8/1997 |
| EP | 0 801 297 A1 | 10/1997 |
| EP | 0 836 083 A1 | 4/1998 |
| EP | 0 843 986 A2 | 5/1998 |
| EP | 0 869 348 A2 | 10/1998 |
| EP | 0 897 164 A2 | 2/1999 |
| EP | 0 897 691 A2 | 2/1999 |
| EP | 0 317 121 B1 | 5/1999 |
| EP | 0 924 656 A2 | 6/1999 |
| EP | 0 982 583 A1 | 3/2000 |
| EP | 0 990 945 A1 | 4/2000 |
| EP | 1 353 292 | 10/2003 |
| EP | 1 434 162 A2 | 6/2004 |
| FR | 2761180 A1 | 1/1998 |
| JP | 61182174 A | 8/1986 |
| JP | 3016160 | 1/1991 |
| JP | 7075629 A | 3/1995 |
| JP | 10-127585 | 5/1998 |
| JP | 2001-033381 A | 2/2001 |
| JP | 2001-112742 | 4/2001 |
| JP | 2001-184490 A | 7/2001 |
| JP | 2002-133402 A | 5/2002 |
| JP | 2002-517835 A | 6/2002 |
| JP | 2003-050993 A | 2/2003 |
| JP | 2003-511101 A | 3/2003 |
| JP | 2003-308520 A | 10/2003 |
| WO | WO 92/00513 A1 | 1/1992 |
| WO | WO 92/17765 A1 | 10/1992 |
| WO | WO 93/00855 A1 | 1/1993 |
| WO | WO 93/07801 A1 | 4/1993 |
| WO | WO 99/27848 A1 | 6/1999 |
| WO | WO 00/30530 | 6/2000 |
| WO | WO 00/46739 A1 | 8/2000 |
| WO | WO 01/15596 A1 | 3/2001 |
| WO | WO 01/18332 A1 | 3/2001 |
| WO | WO 01/20538 | 3/2001 |
| WO | WO 01/27882 A2 | 4/2001 |
| WO | WO 01/52180 A1 | 7/2001 |
| WO | WO 01/52726 A1 | 7/2001 |
| WO | WO 01/53805 A1 | 7/2001 |
| WO | WO 01/65471 A | 9/2001 |
| WO | WO 01/69520 A2 | 9/2001 |
| WO | WO 02/054337 A1 | 7/2002 |
| WO | WO 02/084605 A2 | 10/2002 |
| WO | WO 02/099393 A2 | 12/2002 |
| WO | WO 03/010510 A2 | 2/2003 |
| WO | WO 03/096272 A1 | 11/2003 |
| WO | WO 2004/068388 A2 | 8/2004 |
| WO | WO 2004/068394 A1 | 8/2004 |
| WO | WO 2004/090786 | 10/2004 |
| WO | WO 2006/049394 A | 5/2006 |
| WO | WO 2006/077446 A2 | 7/2006 |
| WO | WO 2006/093508 A2 | 9/2006 |

OTHER PUBLICATIONS

European Patent Application No. 10166537.0, Extended European Search Report mailed on Jun. 1, 2011, 7 pages.

Author Unknown, "Improve the Clinical Outcome of Every Patient," In Line Diagnostics, published on or before Oct. 30, 1997, 2 pages.

Anderson, C. E. et al., "Fundamentals of Calibration Transfer Through Procrustes Analysis," Appln. Spectros., vol. 53, No. 10, 1999, pp. 1268-1276.

Ashboum, Julian, Biometrics; Advanced Identity Verification, Springer, 2000, pp. 63-64.

Bantle, John P. et al., "Glucose Measurement in Patients With Diabetes Mellitus With Dermal Interstitial Fluid," Mosby-Year Book, Inc., 1997, 9 pages.

Berkoben, Michael S. et al., "Vascular Access for Hemodialysis," Clinical Dialysis, Third Edition, 1995, pp. 2 cover pages and 26-45.

Blank, T.B. et al., "Transfer of Near-Infrared Multivariate Calibrations Without Standards," Anal. Chem., vol. 68, 1996, p. 2987.

Bleyer, Anthony J. et al., "The Costs of Hospitalizations Due to Hemodialysis Access Management," Nephrology News & Issues, Jan. 1995, pp. 19, 20 and 22.

Brasunas, John C. et al., "Uniform Time-Sampling Fourier Transform Spectroscopy," Applied Optics, vol. 36, No. 10, Apr. 1, 1997, pp. 2206-2210.

Brault, James W., "New Approach to High-Precision Fourier Transform Spectrometer Design," Applied Optics, Vo. 35, No. 16, Jun. 1, 1996, pp. 2891-2896.

Cassarly, W.J. et al., "Distributed Lighting Systems: Uniform Light Delivery," Source Unknown, 1995, pp. 1698-1702.

Chang, Chong-Min et al., "An Uniform Rectangular Illuminating Optical System for Liquid Crystal Light Valve Projectors," Euro Display '96, 1996, pp. 257-260.

Coyne, Lawrence J. et al., "Distributive Fiber Optic couplers Using Rectangular Lightguides as Mixing Elements," Information Gatekeepers, Inc. Brookline, MA, 1979, pp. 160-164.

Daugirdas, JT et al., "Comparison of Methods to Predict the Equilibrated Kt/V (eKt/V) in the Hemo Study," National Institutes of Health, Aug. 20, 1996, pp. 1-28.

De Noord, Onno E., "Multivariate Calibration Standardization," Chemometrics and intelligent Laboratory Systems 25, 1994, pp. 85-97.

Demos, S. G. et al., "Optical Fingerprinting Using Polarisation Contrast Improvement," Electronics Letters, vol. 33, No. 7, Mar. 27, 1997, pp. 582-584.

Depner, Thomas A. et al., "Clinical Measurement of Blood Flow in Hemodialysis Access Fistulae and Grafts by Ultrasound Dilution," Division of Nephrology, University of California, published on or before Oct. 30, 1997, pp. M745-M748.

Despain, Alvin M. et al., "A Large-Aperture Field-Widened Interferometer-Spectrometer for Airglow Studies," Aspen International Conference on Fourier Spectroscopy, 1970, pp. 293-300.

Faber, Nicolaas, "Multivariate Sensitivity for the Interpretation of the Effect of Spectral Pretreatment Methods on Near-Infrared Calibration Model Predictions," Analytical Chemistry, vol. 71, No. 3, Feb. 1, 1999, pp. 557-565.

Fresenius USA, "Determination of Delivered Therapy Through Measurement of Effective Clearance," Dec. 1994, 2 pages.

Geladi, Paul et al., A Multivariate NIR Study of Skin Alterations in Diabetic Patients as Compared to Control Subjects, Fresenius USA, "Determination of Delivered Therapy Through Measurement of Effective Clearance," 2 pages, Dec. 1994, J. Near Infrared Spectrosc., vol. 8, 2000, pp. 217-227.

Hakim, Raymond M. et al., "Effects of Dose of Dialysis on Morbidity and Mortality," American Journal of Kidney Diseases, vol. 23, No. 5, May 1994, pp. 661-669.

International Search Report and Written Opinion of PCT/US2008/066585 mailed Oct. 30, 2008, 10 pages.

International Search Report and Written Opinion of PCT/US2010/025463 mailed on Jun. 30, 2010, 6 pages.

International Search Report of PCT/US2010/046852 mailed Dec. 29, 2010, 5 pages.

Jacobs, Paul et al., "A Disposable Urea Sensor for Continuous Monitoring of Hemodialysis Efficiency," ASAIO Journal, 1993, pp. M353-M358.

Keshaviah, Prakash R. et al., "On-Line Monitoring of the Delivery of the Hemodialysis Prescription," Pediatric Nephrology, vol. 9, 1995, pp. S2-S8.

Krivitski, Nikolai M., "Theory and Validation of Access Flow Measurement by Dilution Technique During Hemodialysis," Kidney International, vol. 48, 1995, pp. 244-250.

Lee et al., "Fingerprint Recognition Using Principal Gabor Basis Function", Proceedings of 2001 International Symposium on Intelligent Multimedia, Video and Speech Processing, May 2-4, 2001, Sections 2-3.

Maltoni et al., "Handbook of Fingerprint Recognition," 2005, pp. 58-61.

Marbach, Ralf, "Measurement Techniques for IR Spectroscopic Blood Glucose Determination," Fortschritt Bericht, Series 8: Measurement and Control Technology, No. 346, Mar. 28, 1994, pp. cover and 1-158.

Mardia, K.V. et al., "Chapter 11—Discriminant Analysis," Multivariate Analysis, 1979, pp. 2 cover pages and 300-325.

Nichols, Michael G. et al., "Design and Testing of a White-Light, Steady-State Diffuse Reflectance Spectrometer for Determination of Optical Properties of Highly Scattering Systems," Applied Optics, vol. 36, No. 1, Jan. 1, 1997, pp. 93-104.

Nixon, Kristin A. et al., "Novel Spectroscopy-Based Technology for Biometric and Liveness Verification," Technology for Human Identification. Proceedings oF SPIE, vol. 5404, No. 1, XP-002458441, Apr. 12-13, 2004, pp. 287-295 (ISSN: 0277-786x).

Pan et al., "Face Recognition in Hyperspectral Images," IEEE Transactions on Pattern Analysis and Machine Intelligence, vol. 25, No. 12, Dec. 2003, pp. 1552-1560.

Ripley, B. D., "Chapter 3—Linear Discriminant Analysis," Pattern Recognition and Neural Networks, 1996, pp. 3 cover pages and 91-120.

Ronco, C. et al., "On-Line Urea Monitoring : A Further Step Towards Adequate Dialysis Prescription and Delivery," The International Journal of Artificial Organs, vol. 18, No. 9, 1995, pp. 534-543.

Ross et al., "A Hybrid Fingerprint Matcher," Pattern Recognition 36, The Journal of the Pattern Recognition Society, 2003 Elsevier Science Ltd., pp. 1661-1673.

Rowe et al. "Multispectral Fingerprint Image Acquisition," Advance in Biometrics, 2008, 22 pages.

Selvaraj et al., "Fingerprint Verification Using Wavelet Transform," Proceedings of the Fifth International Conference on Computational Intelligence and Multimedia Applications, IEEE, 2003, 6 pages.

Service, F. John et al., "Dermal Interstitial Glucose As an Indicator of Ambient Glycemia," Diabetes Care, vol. 20, No. 9, Aug. 1997, 8 pages.

Sherman, Richard A., "Chapter 4—Recirculation in the Hemodialysis Access," Principles and Practice of Dialysis, pp. 2 cover pages and 38-46, 1994.

Sherman, Richard A., "The Measurement of Dialysis Access Recirculation," American Journal of Kidney Diseases, vol. 22, No. 4, Oct. 1993, pp. 616-621.

Steuer, Robert R. et al., "A New Optical Technique for Monitoring Hematocrit and Circulating Blood Volume: Its Application in Renal Dialysis," Dialysis & Transplantation, vol. 22, No. 5, May 1993, pp. 260-265.

Webb, Paul, "Temperatures of Skin, Subcutaneous Tissue, Muscle and Core in Resting Men in Cold, Comfortable and Hot Conditions," European Journal of Applied Physiology, vol. 64, 1992, pp. 471-476.

Zavala, Albert et al., "Using Fingerprint Measures to Predict other Anthropometric Variables," Human Factors, vol. 17, No. 6, 1975, pp. 591-602.

Chinese Patent Application No. 2006/80038579.4, First Office Action mailed on Mar. 23, 2011, 7 pages.

Rowe, "LumiGuard: A Novel Spectroscopic Sensor for Biometric Security Applications", American Chemical Society 225th National Meeting, Mar. 25, 2003, 20 pages.

* cited by examiner

BIOMETRIC DETECTION USING SPATIAL, TEMPORAL, AND/OR SPECTRAL TECHNIQUES

CROSS-REFERENCES TO RELATED APPLICATIONS

This application is a non-provisional, and claims the benefit, of commonly assigned U.S. Provisional Application No. 60/911,007, filed Apr. 10, 2007, entitled "Spatial And Temporal Biometric Detection," the entirety of which is herein incorporated by reference for all purposes.

BACKGROUND OF THE INVENTION

This application relates generally to biometric feature detection. More specifically, this application relates to spectral, spatial, and/or temporal detection of a biometric feature.

Fingerprint-based biometric sensors are used across a broad range of applications, from law enforcement and civil identification to commercial access control. They are even used in some consumer devices such as laptops and cellular telephones. In at least some of these applications, there is a general need in the art to know when a biometric feature is placed on the sensor and to detect when a foreign object, other than a biometric feature, is placed on the sensor or where a biometric feature is located relative to a target location.

SUMMARY

A biometric feature detection system is provided according to one embodiment. The biometric feature detection system may include a target, an illumination source, a color filter array, a light detector, and a computational unit. In one embodiment, the target includes a target surface configured to receive a biometric feature at the target surface. In one embodiment, the illumination source is configured to illuminate at least a portion of a target surface from below the target surface with monochromatic light at a large angle of incidence measured from the normal of the target surface. The illumination source may include a plurality of illumination sources, such as LEDs. The illumination source may also provide blue light according to another embodiment. According to one embodiment, the color filter array may include a plurality of color mosaics arrayed across the color filter array. The color filter array, for example, may include a Bayer filter or the like. According to one embodiment, the light detector is configured to receive light from the target through the color-filter array and provide an image of the target surface. Moreover, each pixel of the light detector corresponds to one of the plurality of color mosaics such that each pixel detects light associated with corresponding color mosaic. According to one embodiment, the computational unit is interfaced with the light detector. The computation unit may also include instructions to monitor the levels of blue light and compute a mathematical function on the levels of blue light in proportion with levels of other light.

A method for detecting the proximity of a potential biometric feature to a target is also provided according to another embodiment. The method may include illuminating at least a portion of the target and a portion of the area above the target surface from below the target surface with monochromatic light at a large angle of incidence measured from normal of the target surface. Light may then be received at a light detector. This light may include ambient light. A determination is then made whether a potential biometric feature is near the surface target based on the intensity of the monochromatic light received at the light detector relative to the intensity of light other than the monochromatic light received at the light detector. According to another embodiment, the method may also monitor the relative intensity of the monochromatic light relative to the intensity of light other than the monochromatic light, filtering light into a plurality of wavelength bands prior to receiving light at the light detector. According to another embodiment, the method may also filter the light using a color filter array or the like.

A method is provided for identifying when a purported biometric feature is placed on a target surface according to another embodiment. At least a portion of a target surface and a portion of the area above the target surface may be illuminated from below the target surface with monochromatic light. For example, the monochromatic light may be blue light or light less than about 600 nm according to embodiments. The monochromatic light may include a wavelength that is absorbed by blood. Light may be received at a light detector that includes monochromatic light reflected from the purported biometric feature at or near the target surface. The intensity of the monochromatic light received at the light detector is monitored. The method may then identify when the purported biometric feature is placed on the target surface by determining when the intensity of monochromatic light received at the light detector increases due to blood loss in portions of the purported biometric feature.

A biometric feature presence detector is also provided according to another embodiment. The detector may include a target, a monochromatic light source, a light detector and a computational unit. In one embodiment, the target includes a target surface configured to receive a biometric feature at the target surface. In one embodiment, the illumination source is configured to illuminate at least a portion of a target surface from below the target surface with monochromatic light at a large angle of incidence measured from the normal of the target surface. The illumination source may include a plurality of illumination sources, such as LEDs. The illumination source may also provide blue light according to another embodiment. According to one embodiment, the light detector is disposed below the target surface and configured to receive light from the target surface and a portion of the area above the target surface. In one embodiment the computational unit is interfaced with the light detector. The computational unit may perform a variety of functions according to a variety of embodiments. In one embodiment the computational unit includes instructions to monitor the intensity of monochromatic light received at the light detector. In one embodiment the computational unit includes instructions to identify when the purported biometric feature is placed on the target surface by determining when the intensity of monochromatic light received at the light detector increases due to blood loss in portions of the purported biometric feature.

A method for segmenting a biometric feature from the background is also provided according to one embodiment. The method includes illuminating a biometric feature with monochromatic light and filtering light reflected from the biometric feature with a color filter array into a plurality of wavelength bands. In one embodiment, one of said plurality of wavelength bands corresponds with the wavelength of the monochromatic light illuminating the biometric feature. Light reflected from the biometric feature may be filtered by the color filter array and detected at a detector. Each pixel of the detector receives light corresponding to a wavelength band and providing an image of the target. Pixels corresponding with the wavelength of the monochromatic light are compared. Portions of the image corresponding to a purported biometric feature may then be segmented from portions of the image corresponding to the background by comparing the levels of a wavelength band corresponding to monochromatic light with the levels of another wavelength band.

A biometric feature presence detector is also provided according to another embodiment. The biometric feature presence detector may include a target, one or more monochromatic light sources; a color filter array, a light detector and a computational unit. In one embodiment, the target may include a target surface adapted to receive a potential biometric feature. In one embodiment, the monochromatic light source may be disposed below the target surface and illuminates at least a portion of the target surface and a portion of the area above the target surface with monochromatic light. In one embodiment, the light detector is disposed below the color filter array and the target surface. The light detector may be configured to receive light from the target surface and a portion of the area above the target surface through the color filter array. The computational unit may be interfaced with the light detector and may include instructions to segment portions of the image corresponding to a purported biometric feature from portions of the image corresponding to the background by comparing the levels of a wavelength band corresponding to monochromatic light with the levels of another wavelength band.

A biometric sensor is provided according to another embodiment. The biometric sensor may include a target, at least two illumination sources separated by a distance, an imager and a computational device. In one embodiment, the at least two illumination sources alternately illuminate the target and a portion of the area above the target. In one embodiment the imager may be configured to receive light reflected off a purported biometric feature from the at least two illumination sources as the purported biometric feature approaches the target. In one embodiment, the computational device may be coupled with the imager and may include instructions to process images created under each of the alternating illumination schemes. In one embodiment, the computational may also include instructions to make a comparison between the images to determine whether a biometric feature is at the target surface.

A method for determining the proximity of a purported biometric feature relative to a target surface is also provided according to another embodiment. The method may include all or any of the following in any combination: 1) illuminating at least a portion of the target and a portion of the area above the target surface with a first illumination source; 2) capturing a first image of the target area; 3) illuminating at least a portion of the target and a portion of the area above the target surface with a second illumination source, wherein the first and second illumination sources are separated by a distance; 4) capturing a second image of the target area; 5) comparing the intensity profile across a portion of the first image with a portion of the second image; and 6) determining the proximity of the purported biometric feature from the peak intensity separation in the first image and the second image.

DETAILED DESCRIPTION OF THE INVENTION

Figure 1A:
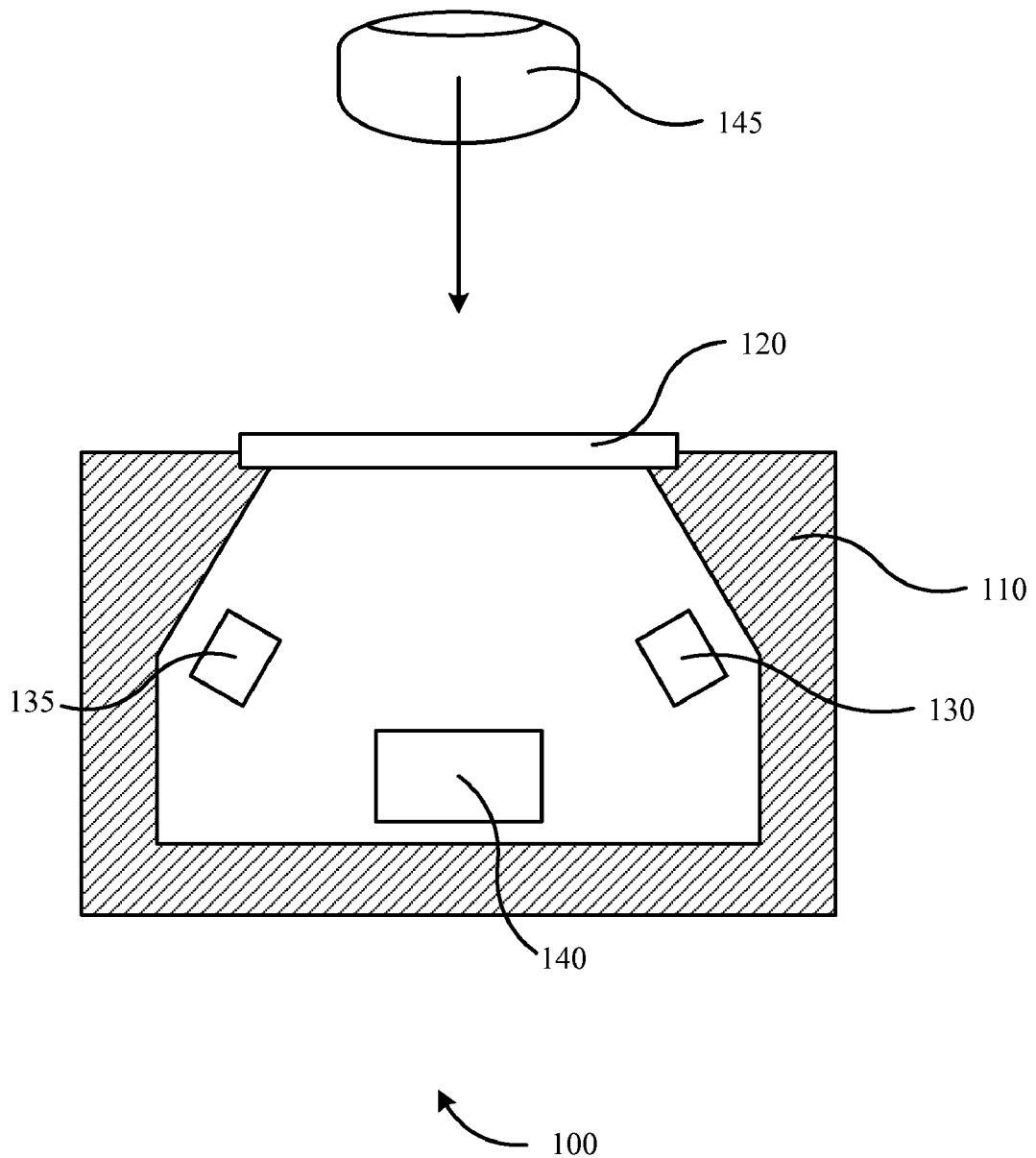
FIG. 1A shows a finger approaching a biometric sensor under stereoscopic illumination according to one embodiment.

Embodiments are provided throughout this disclosure that provide proximity, presence, and/or segmentation detection of a biometric feature at a target. The various embodiments may be used in conjunction, for example, with a fingerprint verification and/or identification system, retinal scanners, handprint verification and/or identification system, and/or the like. Proximity detection refers generally to determining the relative nearness of a biometric feature, such as a skin site on a finger, to a target surface. Presence detection refers generally to determining whether a biometric feature is present at a target surface. Segmentation refers generally to segmenting the portions of a biometric feature from the background and/ or other ambient features in an image including a biometric feature. Segmentation may occur at anytime. In some embodiments, segmentation may occur in real time, that is, prior to, during or immediately after image capture.

A biometric system is disclosed according to one embodiment that includes a target configured to receive a biometric feature for identification. The target may be a transparent plate, platen, prism, glass, plastic, etc. The target may include a surface designed to receive a biometric feature, such as a skin site. One or more monochromatic blue light sources may be arranged circumferentially around the target. Various other light sources may be used with various wavelengths. The light sources may illuminate the target surface at an angle of about 60° from the normal of the target. The light sources may be below the target surface. A detector coupled with a color filter array, such as, for example, a Bayer filter may be used to filter light received from the target. Such light may be ambient light and/or monochromatic light reflected from objects near the target. The detector in conjunction with the color filter array may provide spectral data across the detector array. The spectral data may be used, according to some embodiments of the invention, to determine the proximity, presence and/or segmentation of a biometric feature. Temporal and/or spatial information may also be used to determine the presence, proximity and/or segmentation of a biometric feature in relation to the target.

Skin sites applicable to the biometric detection described herein include all surfaces and all joints of the fingers and thumbs, the fingernails and nail beds, the palms, the backs of the hands, the wrists and forearms, the face, the eyes, the ears, and all other external surfaces of the body. While the discussion below sometimes makes specific reference to "fingers" in providing examples of specific embodiments, it should be understood that these embodiments are merely exemplary and that other embodiments may use skin sites at other body parts.

According to one embodiment of the invention the proximity and/or presence of a biometric feature relative to a target may be determined by measuring the convergence of intensity peaks in images of a biometric feature from separately illuminated light sources as the biometric feature approaches the biometric sensor. Another embodiment compares biometric images with expected biometric feature characteristics to determine whether a recorded image is from an expected biometric feature or from a rogue source.

FIG. 1A shows a biometric sensor 100 with stereoscopic illumination according to one embodiment. The biometric sensor 100 includes, at least, a body 110, two illumination sources 130 separated by some distance, an imager and a platen 120 that may have a surface for receiving a biometric feature such as finger. A biometric sensor so configured may be used to determine the proper time to record a biometric image and determine whether an expected biometric feature is placed on the platen 120 or is approaching the platen 120.

In the embodiment shown in FIG. 1A, the biometric sensor may be used to read fingerprints from a finger 145 when the finger 145 is placed on the platen 120. While a fingerprint system is described below, those skilled in the art will recognize that the system may be applicable to other biometric systems. As shown, the finger 145 is approaching the platen 120 from some distance. As the finger 145 approaches the platen 120 the two illumination sources 130 alternate illuminating the finger 145. The imager 140 records images of the finger 145 under the alternating illumination schemes. A cross section from each of the alternating images may be compared against each other. More than two illumination sources may be used.

Figure 1B:
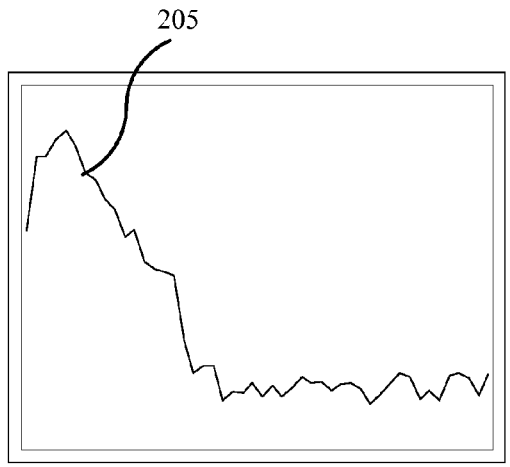
FIGS. 1B-1D show graphs of the finger as recorded by the biometric sensor under the illumination configuration shown in FIG. 1A according to one embodiment.
Figure 1C:
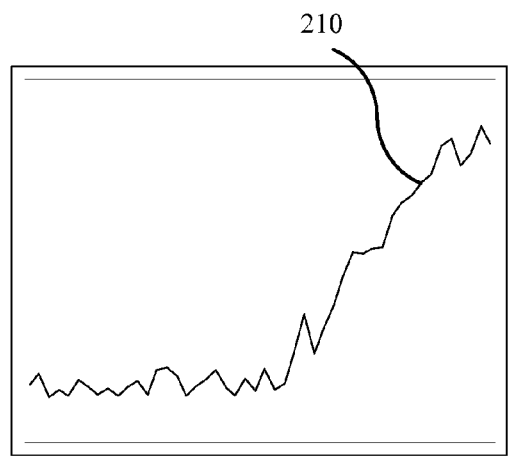
Figure 1D:
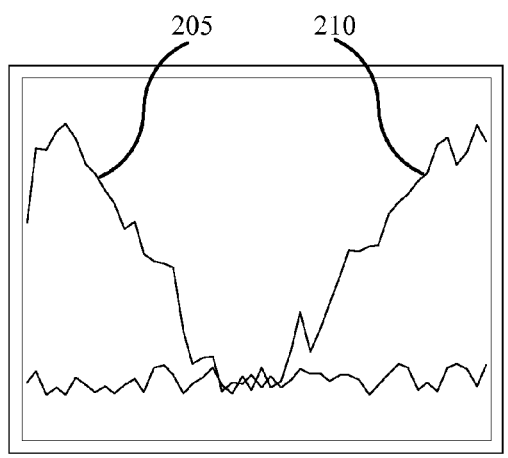

FIGS. 1B and 1C show graphs of the light intensity over a cross section of a biometric feature under illumination from each of the two illumination sources 130 shown in FIG. 1A. FIG. 1B shows a peak intensity towards the right of the cross section and FIG. 1C shows a peak in intensity towards the left of the cross section. The separation in peak intensity is due to the different perspectives from which the illumination sources 130 illuminate the finger 145. FIG. 1D shows the graphs of FIGS. 1B and 1C overlaid showing the peak intensity separation. The separation in intensity peaks shown in FIGS. 1B and 1C are a result of the distance the finger 145 is from the platen 120.

Figure 2A:
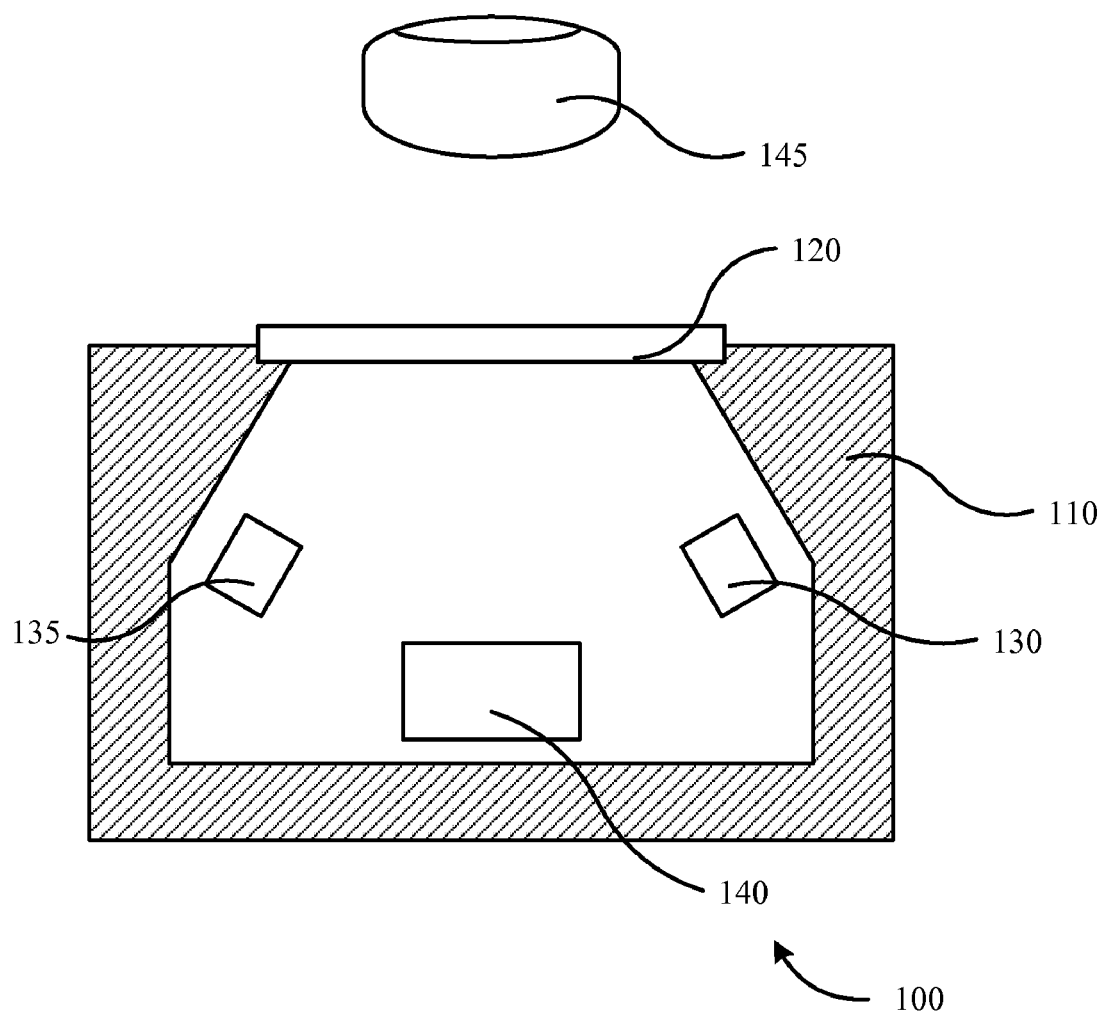
FIG. 2A shows a finger approaching a biometric sensor under stereoscopic illumination according to one embodiment.
Figure 2B:
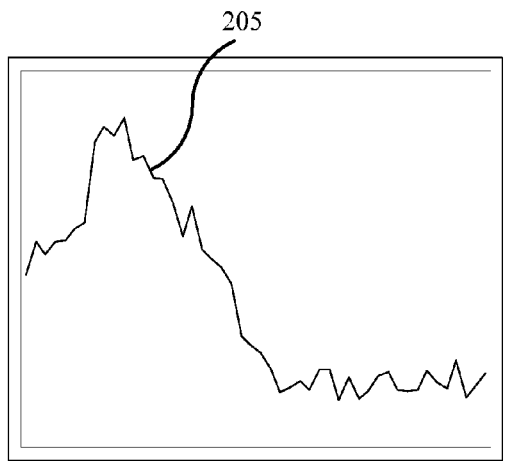
FIGS. 2B-2D show graphs of the finger as recorded by the biometric sensor under the illumination configuration shown in FIG. 2A according to one embodiment.
Figure 2C:
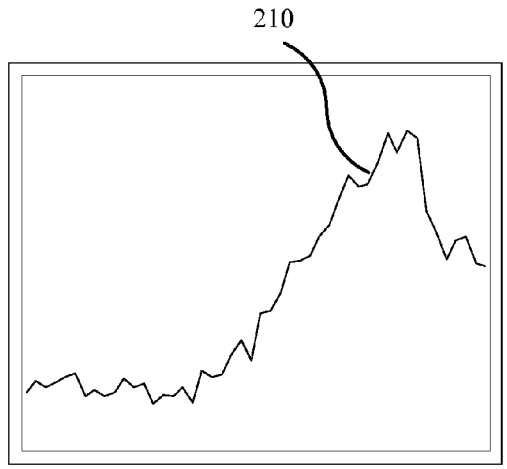
Figure 2D:
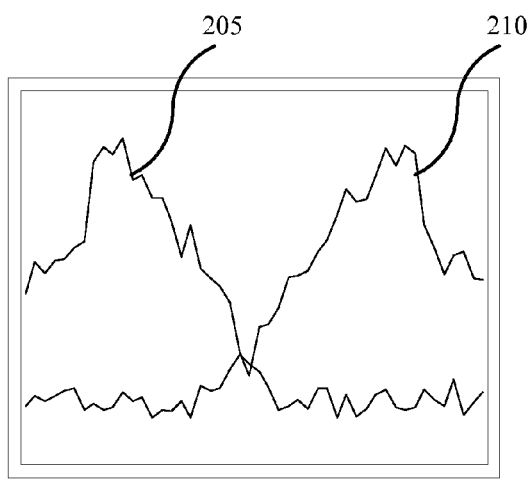
Figure 3A:
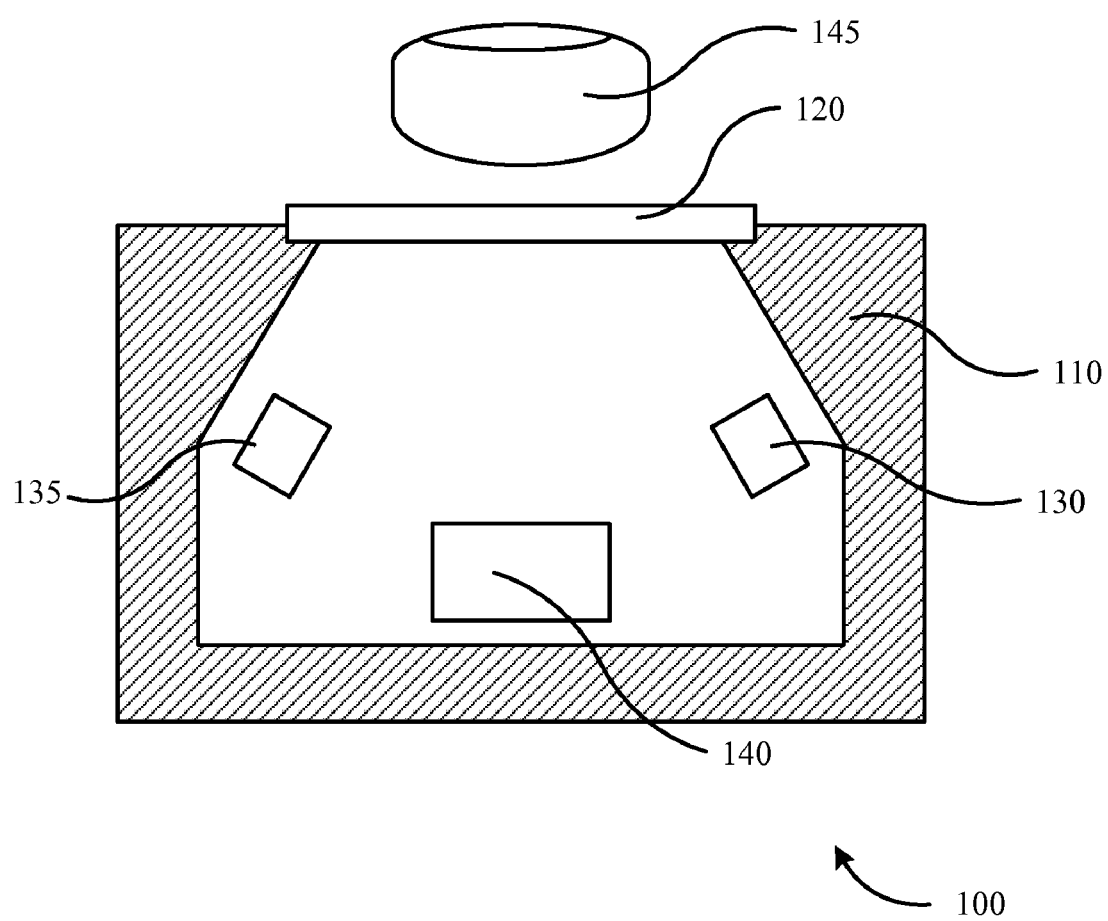
FIG. 3A shows a finger approaching a biometric sensor under stereoscopic illumination according to one embodiment.
Figure 3B:
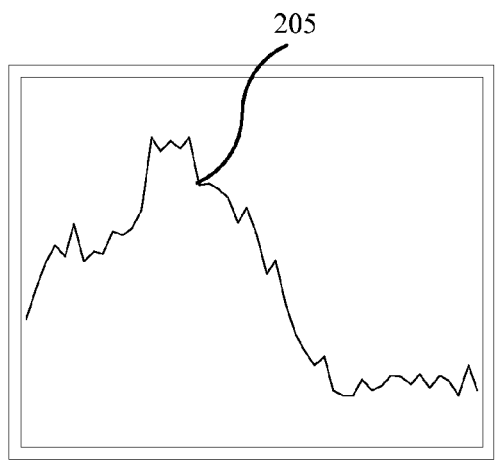
FIGS. 3B-3D show graphs of the finger as recorded by the biometric sensor under the illumination configuration shown in FIG. 3A according to one embodiment.
Figure 3C:
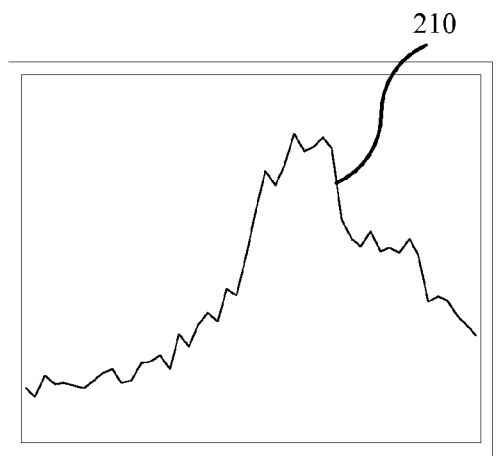
Figure 3D:
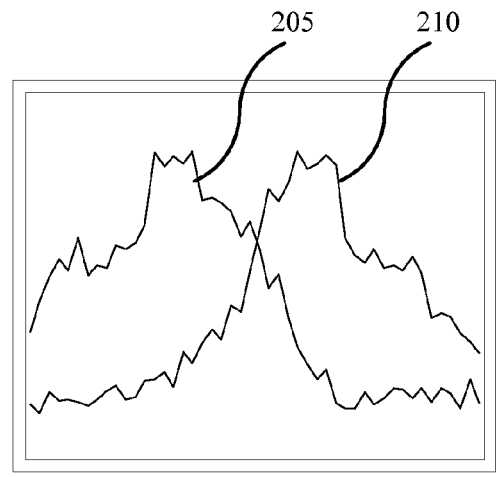

FIG. 2A shows the finger 145 at a position closer to the biometric sensor 100. FIGS. 2B-2D show the corresponding graphs of intensity verses cross section of the finger 145. In FIG. 2D plots of the two cross section images are overlaid and show the two intensity peaks closer together as the finger moves closer to the platen 120. FIG. 3A shows the finger 145 at a position even closer to the biometric sensor 100. FIGS. 3B-3D show the corresponding graphs of intensity verses cross section of the finger 145. In FIG. 3D the two intensity peaks are much closer together.

Figure 4A:
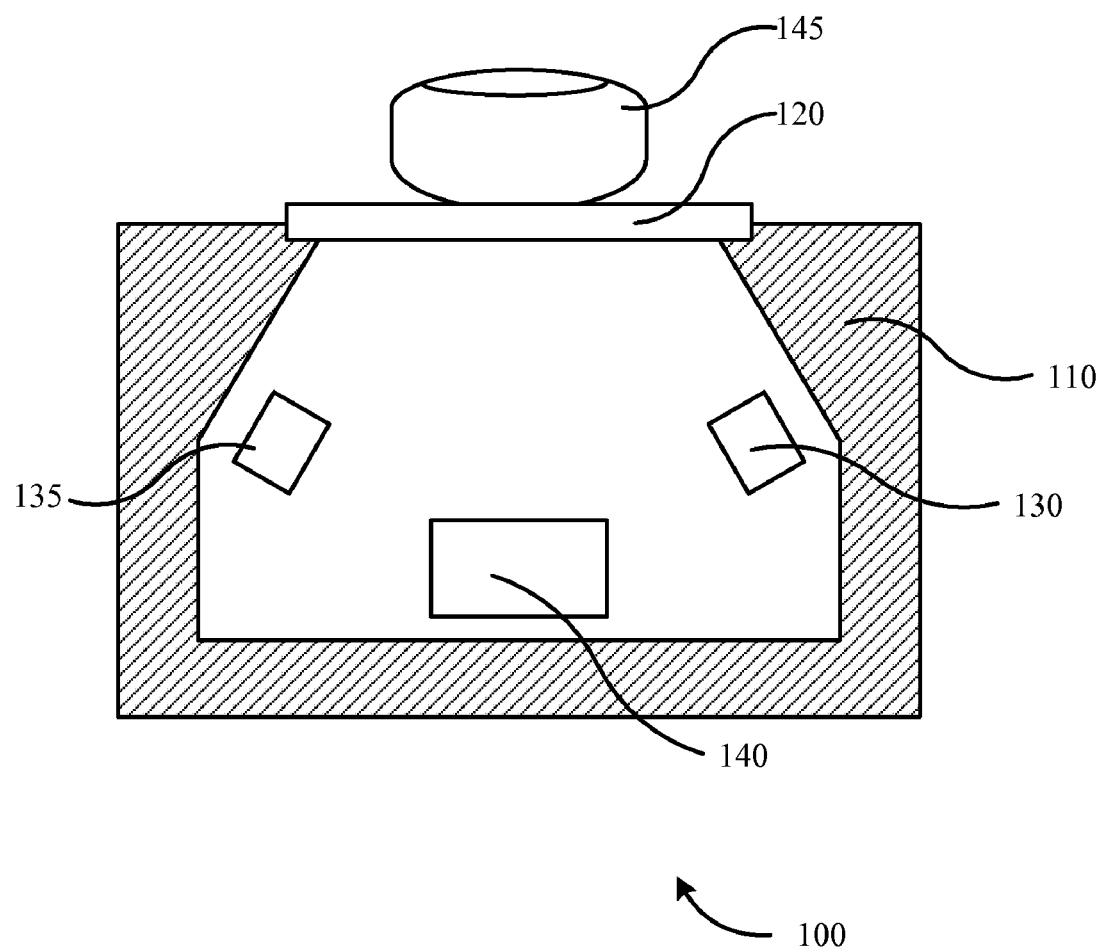
FIG. 4A shows a finger approaching a biometric sensor under stereoscopic illumination according to one embodiment.
Figure 4B:
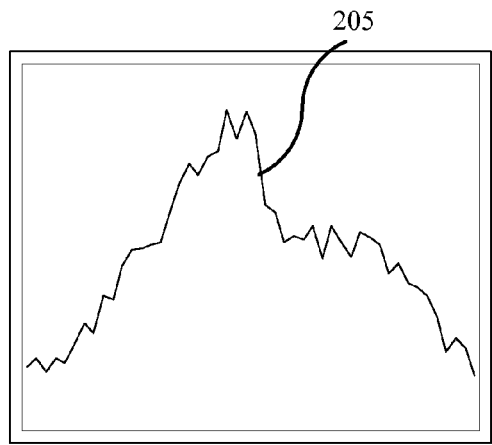
FIGS. 4B-4D show graphs of the finger as recorded by the biometric sensor under the illumination configuration shown in FIG. 4A according to one embodiment.
Figure 4C:
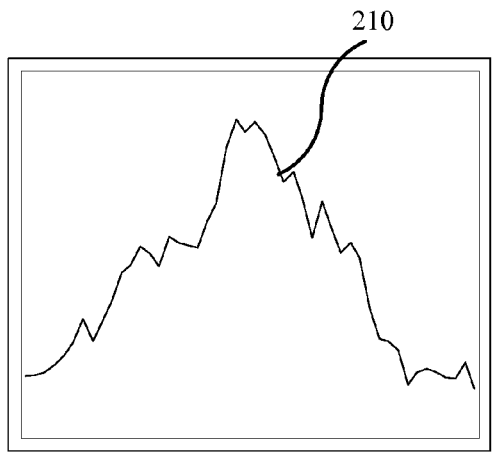
Figure 4D:
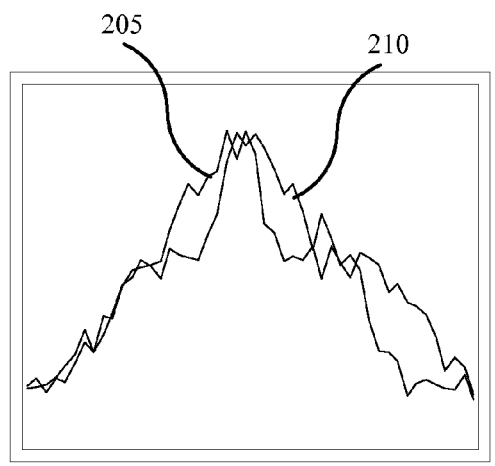

Finally, in FIG. 4A the finger 145 is resting on the platen 120 of the biometric sensor 145. FIGS. 4B and 4C show intensity peaks under the two illumination schemes. At this point the intensity peaks have substantially converged as shown in FIG. 4D. As the finger 145 approaches the platen 120 of the biometric sensor 100, the stereoscopic nature of the dual illumination sources provides data regarding the position of the finger 145. Accordingly, a system may determine when a biometric feature is at the platen 120 for recording by measuring the convergence of the peak intensity over a cross section of the biometric feature.

In some embodiments, depending on the distance between each of the illumination sources 130 and/or the distances between the illumination sources 130 and the platen 120, the amount of divergence required to know when to record an image may vary. Those skilled in the art will recognize that a simple calibration may be required to determine the ideal amount of convergence that may be used for a specific biometric sensor configuration to show that a biometric feature is on the platen 120. Moreover, calibration may be used to determine the distance of a biometric feature from the surface of the target. For instance, in non-contact biometric schemes, a biometric feature does not need to be in contact with the biometric feature. Accordingly, the proximity detection embodiments described throughout this disclosure may be used to determine the distance of a biometric feature from the surface of the target.

Figure 5:
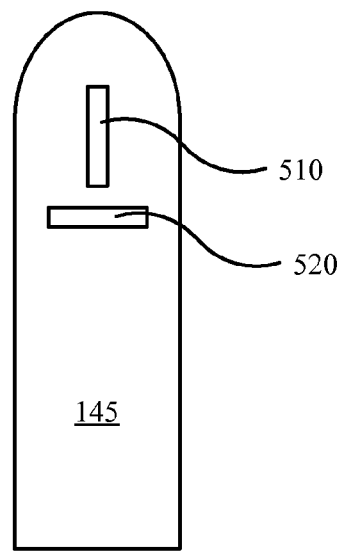
FIG. 5 shows a finger with two viewable cross sections shown according to one embodiment.

FIG. 5 shows a finger 145 with two exemplary cross sections 510, 520 that may be used by embodiments of the invention. The imager may record an image of the entire finger 145 and then use only the cross section of the finger 145 to determine the position of the finger 145 and/or whether a purported biometric feature on the platen 120 is a biometric feature or not. These cross sections may also be used to determine whether a biometric feature is properly placed on the platen. Using the cross section information, the system may alert a user that the biometric feature must be moved in order to be more properly imaged.

Figure 6:
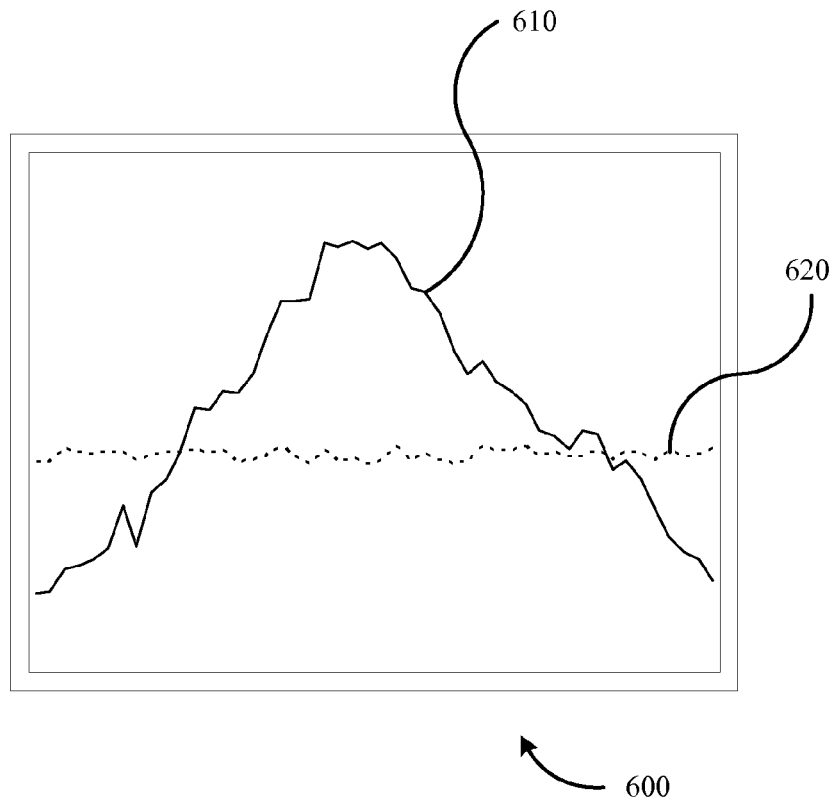
FIG. 6 shows a graph comparing the results of a biometric feature compared with a flat feature according to one embodiment.

Another embodiment determines whether an object on the platen 120 is an expected biometric feature, such as a finger, a retina, a hand, a face, etc, or a rogue feature. FIG. 6 shows a graph 600 comparing two cross sections of two different objects placed on the platen 120. The flat graph line 620 shows the cross section when a flat object, such as a piece of paper is placed on the platen 120. The peaked graph line 610 shows a curved object, such as a finger 145. By comparing a cross section of the intensity one can determine whether an object on the platen 120 is the expected object or not. For example, a fingerprint sensor would compare cross sections with a general finger cross section to determine whether the object placed on the platen is the expected object. Other biometric feature detection systems may also make similar comparisons.

In another embodiment, multispectral data may be recoded by the imager. The multispectral information may be compared with an expected object's known multispectral response to white light or other illumination sources. For example, the skin on a finger absorbs and reflects light of various unique wavelengths. This known spectral response may be used to determine whether an object on a platen is or is not a finger as expected. Using this information, the biometric sensor will know whether or not to record an image. Accordingly, various embodiments of the invention provide imaging that may or may not use illumination sources other than the illumination sources used for proximity detection, presence detection and/or segmentation.

The imager (or detector) used in embodiments of the invention may comprise a silicon imaging array, such as a CCD or CMOS array, an InGaAs array, or other detector arrays as known in the art. In some instances, the imager may also comprise an optical filter. The optical filter may be a short-wavelength pass filter, which substantially blocks light of wavelengths longer than the illumination wavelength range. Such a may be used in the presence of bright, broad-band ambient lighting, since wavelengths of light longer than approximately 580 nm may substantially traverse the finger. In bright sunlight, this long wavelength light may saturate the detector array preventing the acquisition of an image. Blocking such long-wavelength light with filter while passing all desired illumination wavelengths may thus be beneficial.

Figure 7:
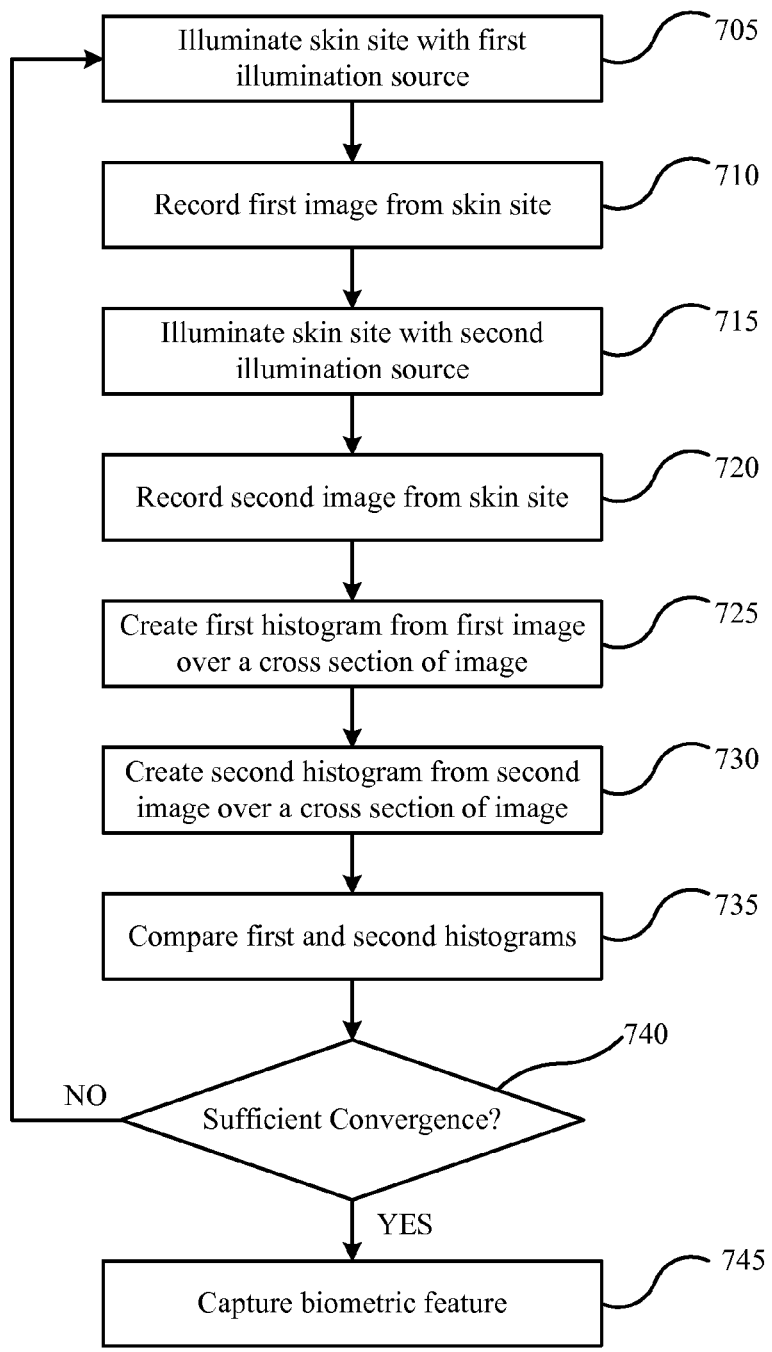
FIG. 7 shows a flowchart showing a method to determine whether an expected biometric feature is on the platen according to one embodiment.

FIG. 7 shows a flowchart showing a method to determine whether an expected biometric feature is on the platen 120 according to one embodiment. As shown in the flowchart, the method uses two illumination sources to stereoscopically determine when an object is resting on the platen 120 by following the convergence of histograms of cross sections of the object as recorded by the imager.

The surface of a target may be illuminated with a first illumination source at block 705. A first image is recorded at block 710. The surface of the target may then be illuminated with a second illumination source at block 715. The first and second illumination sources may be located at a distance from each other. The first and second illumination sources may, according to one embodiment, provide light that is incident on the target surface at an angle greater than 60° measured from the normal of the target surface. In another embodiment, the incident angle is 50°, 55°, 65°, 70°, 80°, 85°, etc. The incident angle is measured from the normal of the target surface and the line between the center of the illumination source the center of the illumination source.

Figure 8:
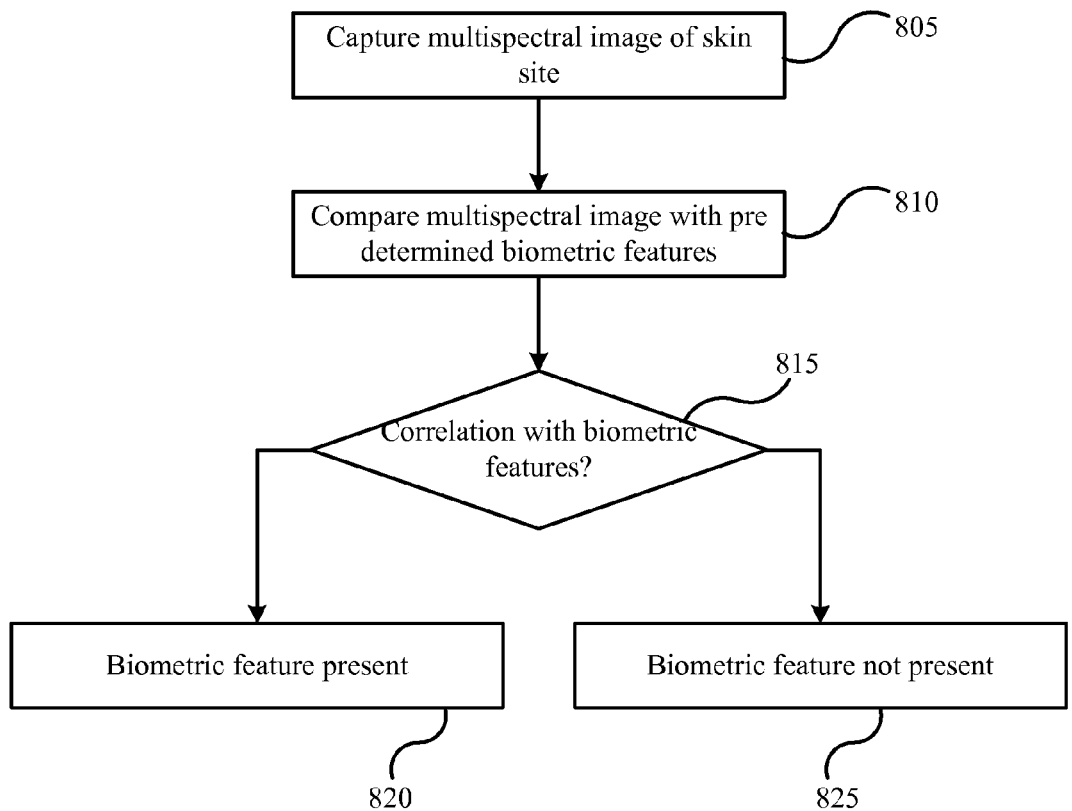
FIG. 8 shows another flowchart showing a method of determining whether an object on or near the biometric site is a biometric feature according to one embodiment.

FIG. 8 shows another flowchart showing a method of determining whether an object on or near the biometric site is an expected biometric feature according to one embodiment. The method captures a multispectral image of an object at the target surface. The captured image is then compared with predetermined features of an expected biometric feature to determine whether the object is an expected biometric feature or not.

A multispectral image of a purported biometric feature is captured at block 805. The multispectral image may then be compared with general predetermined characteristics associated with the biometric feature at block 810. For example, as shown in FIG. 6, a finger has a different response from the convergence of stereoscopic illumination sources than a flat object, such as paper or rubber with a finger print fabrication. Also, for example, human fingers have different multispectral characteristics than paper or rubber fingerprint fabrication. An eye also has general multispectral characteristics that may be used to distinguish fakes from real eyes.

Figure 9A:
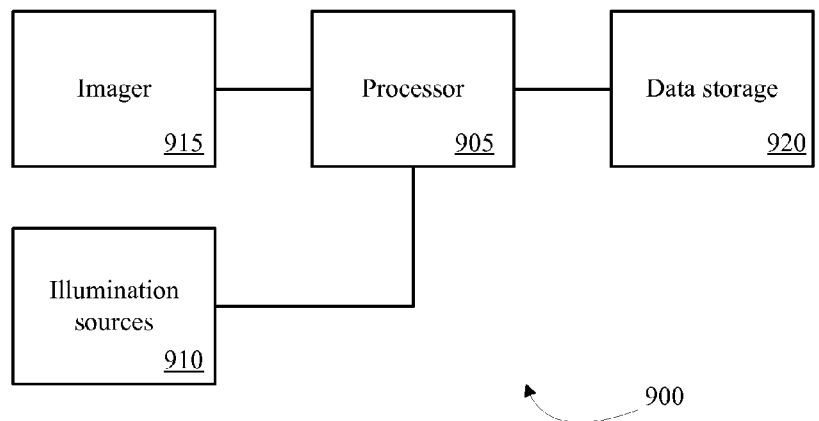
FIG. 9A shows a block diagram of a biometric sensor system according to one embodiment.

FIG. 9A shows a block diagram 900 of a biometric sensor system according to one embodiment. The block diagram 900 may be used to implement embodiments of the invention. Illumination sources and/or an imager are coupled with the processor. The processor 905 may receive images from the imager 915 and analyze cross sections to determine whether an object is approaching a platen 120 or whether an object on the platen 120 is an expected object. Data storage 920 may be used to store images received from the imager 915. Characteristics of various biometric features and/or biometric identifiers of individuals may also be stored in the data storage 920. Any type of data storage device may be used. The processor 905 may also be used to control the illumination sources 910. The processor 905 may determine when to turn the illumination sources 910 "on" or "off". In embodiments where the illumination sources are alternately illuminated, the processor 905 may determine and/or dictate the frequency of illumination and/or the duration of a cycle. The processor 905 may also be used to control illumination sources used for imaging and/or biometric identification.

In various embodiments, a biometric sensor, whether it be a non-contact, contact, or texture sensor of any of the types described above, may be operated by a computational system to implement biometric functionality. This computation system, for example, may be the processor or part of the processor shown in FIG. 9A.

Figure 9B:
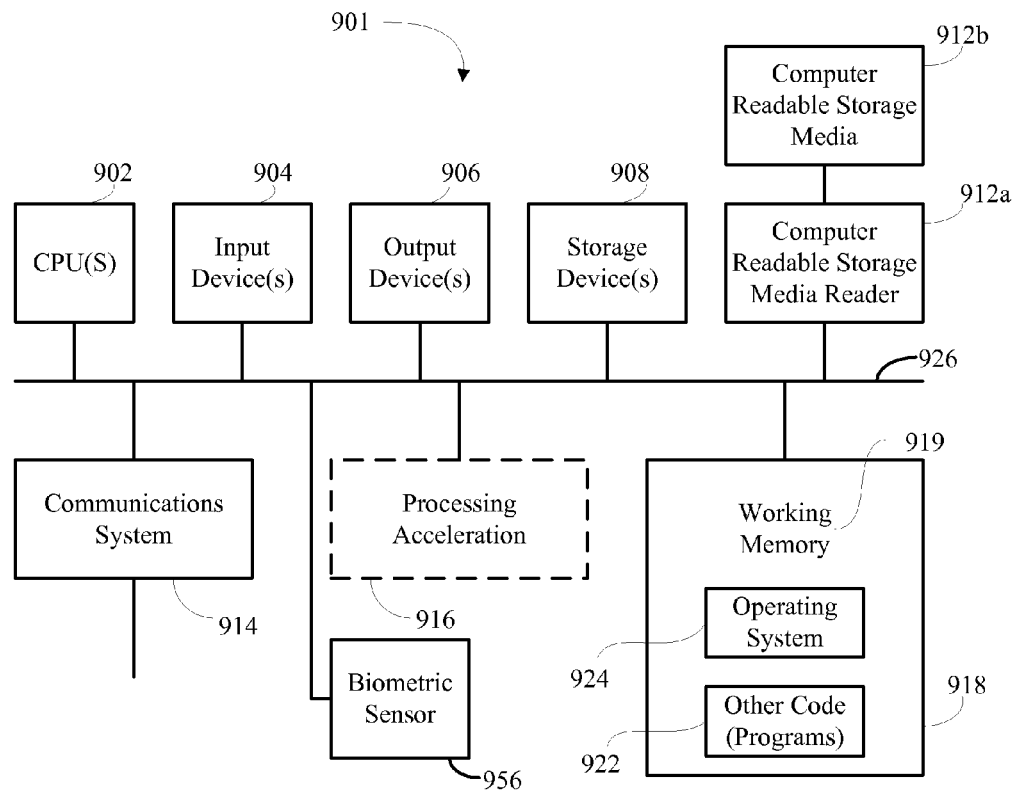
FIG. 9B is a schematic representation of a computer system that may be used to manage functionality of various embodiments of the invention.

FIG. 9B broadly illustrates how individual system elements may be implemented in a separated or more integrated manner. The computational device 901 is shown comprised of hardware elements that are electrically coupled via bus 926, which is also coupled with the biometric sensor 956. The hardware elements include a processor 902, an input device 904, an output device 906, a storage device 908, a computer-readable storage media reader 912a, a communications system 914, a processing acceleration unit 916 such as a DSP or special-purpose processor, and a memory 918. The computer-readable storage media reader 912a is further connected to a computer-readable storage medium 912b, the combination comprehensively representing remote, local, fixed, and/or removable storage devices plus storage media for temporarily and/or more permanently containing computer-readable information. The communications system 914 may comprise a wired, wireless, modem, and/or other type of interfacing connection and permits data to be exchanged with external devices.

The computational device 901 also may also comprise software elements, shown as being currently located within working memory 919, including an operating system 924 and other code 922, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Figure 10:
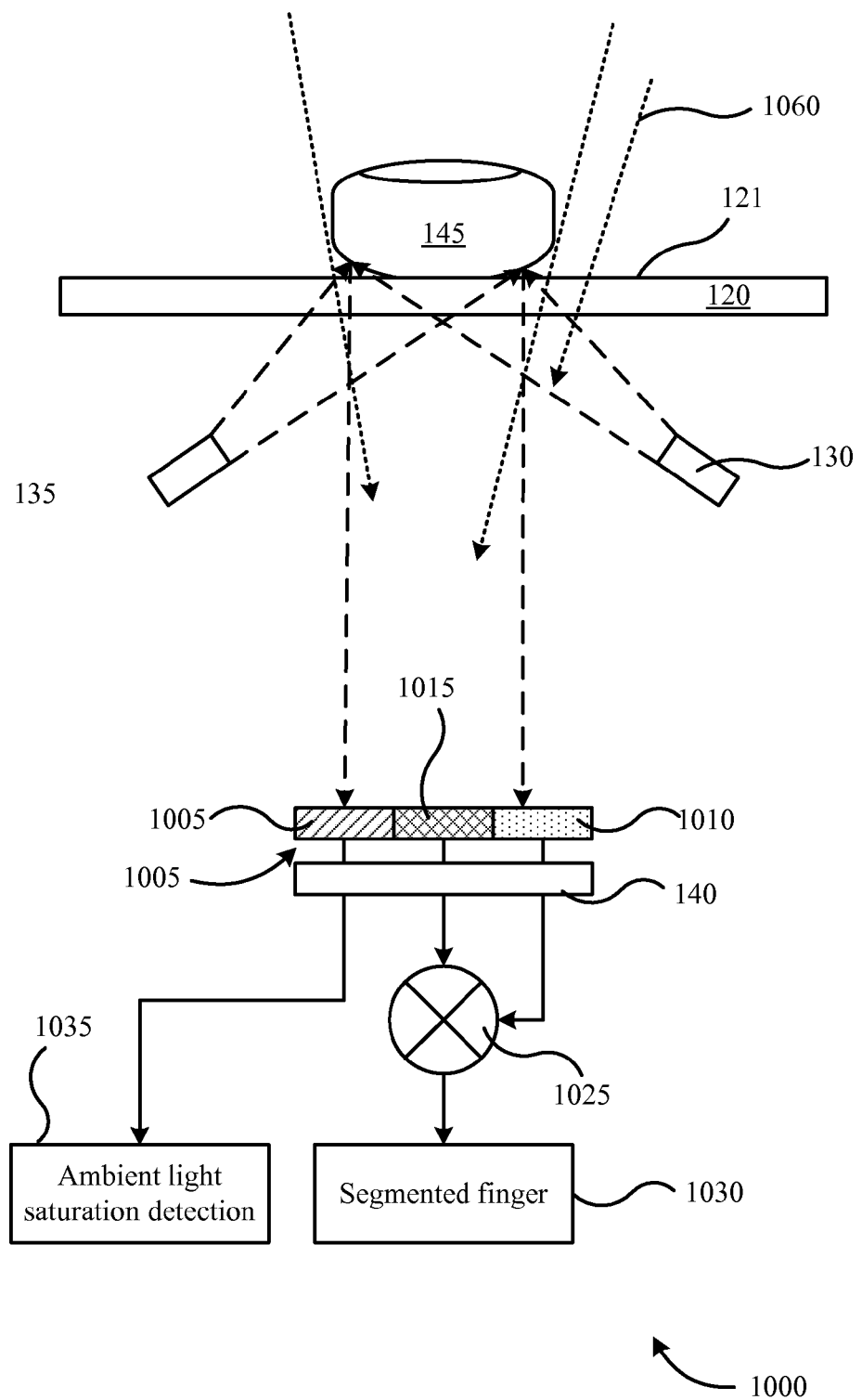
FIG. 10 shows another biometric detection system 1000 according one embodiment of the invention.

FIG. 10 shows another biometric detection system 1000 according one embodiment of the invention. The system includes a target 120 adapted to receive a biometric feature, for example, a finger 145. The target 120 includes a target surface 121 for receiving a biometric feature, such as a finger 145. The target may be any transparent material, such as, for example, glass, plastic, etc. The target may also be multifaceted. As shown in the figure, two illumination sources 130, 135 illuminate the target 120 from beneath the target. In the example describing this embodiment, the illumination sources operate at less than 600 nm. The illumination sources also illuminate the finger 145 placed on the target. In various embodiments of the invention, the illumination sources 130, 135 are monochromatic sources. In other embodiments, the illumination sources 130, 135 provide light with a wavelength less than about 600 nm. In another embodiment, the illumination sources provide blue light. For example, blue light emitting LEDs may be used. As another example, a white light source with a blue light filter may also be used. The illumination sources, according to other embodiments of the invention, may be quasi-monochromatic sources, solid-state LEDs, organic LEDs, laser diodes, other kinds of lasers and/or quasi-monochromatic sources. The sources 507 may further comprise lenses, mirrors, optical diffusers, optical filters and other such optical elements.

Moreover, in other embodiments, more than two illumination sources may be used. The dashed lines show light from the illumination sources reflecting off portions of the finger 145. The dotted lines 1060 show ambient light passing through the target.

Figure 11:
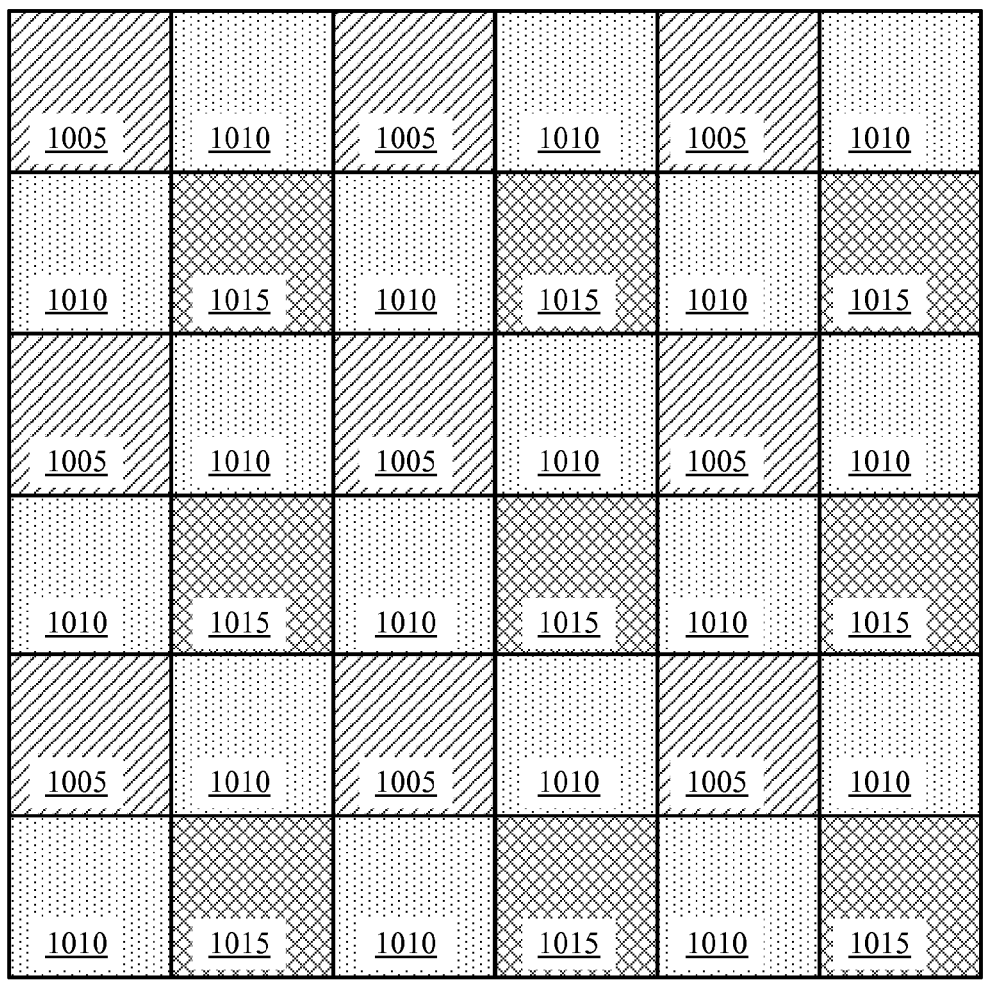
FIG. 11 shows a Bayer color filter array.

The biometric detection system also includes a color filter array 1005, such as, for example, a Bayer filter, between the detector 140 and the target. In some embodiment, the color filter array is on the detector or part of the detector Each pixel of the detector corresponds to a color pattern on the color filter array 1005. Various other color filter arrays may be used, such as, for example, a RGBE, CYMG, RGBW, RGBW #1, RGBW #2, RGBW #3, etc. In certain embodiments, the color filter array filters light by wavelength range, such that the separate filtered intensities include information about the color of light. For example, as shown in FIG. 11, a Bayer filter 1100 gives information about the intensity of light in red 115, green 1110, and blue 1105 wavelength regions. Each mosaic is associated with a pixel on the sensor 140. Thus, spectral information may be gathered corresponding to locations on the detector array. Turning back to FIG. 10, various functions may be performed on the detected images. For example, segmentation may be determined by performing a function 1025 on the light filtered by the blue filter 1015 and the light filtered by the green filter 1010. According to one embodiment, proximity and/or presence detection may, for example, use light filtered by the blue filter 1015 in reference to light filtered by the red and/or green filters 1005, 1010. In one embodiment, the light filtered by the red filter 1005 may be used to measure the ambient transmissions, which may be used as a quality metric. Various other functions may be performed using the filtered image data. For example, the ratio, difference, product, sum, or other linear or non-linear function may be used to determine the presence, proximity and/or segmentation of a biometric feature.

Figure 12A:
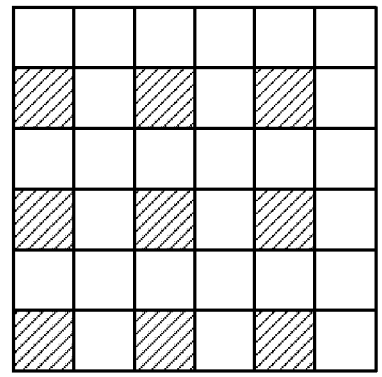
FIGS. 12A-12C show an example of how a Bayer filter array works under ideal conditions.
Figure 12B:
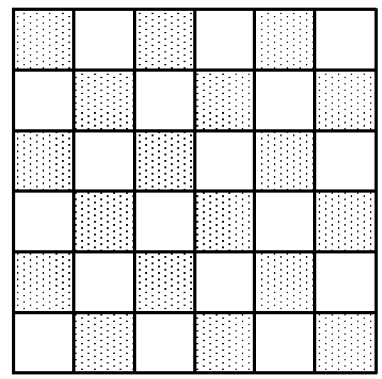
Figure 12C:
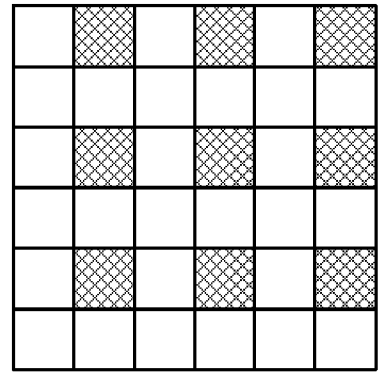
Figure 13:
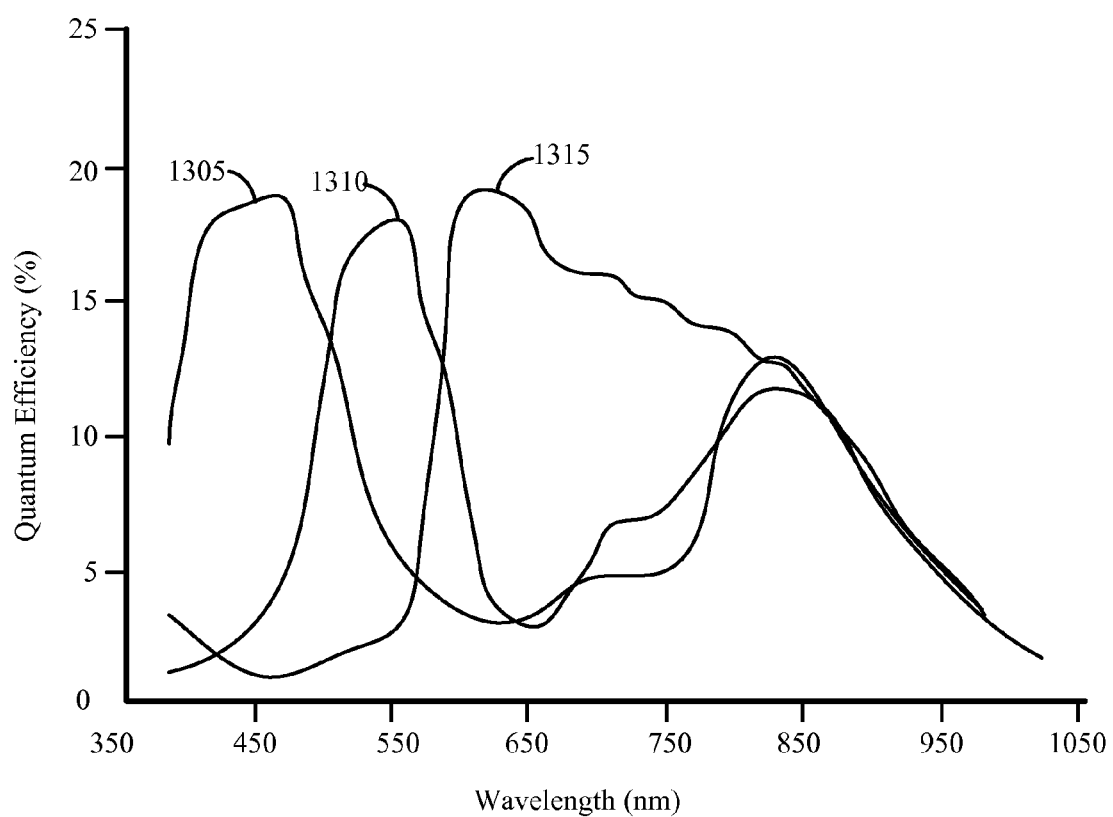
FIG. 13 shows a typical color response curve for a typical Bayer filter array.

FIGS. 12A-12C show an example of how a Bayer filter array works under ideal conditions. Starting with FIG. 12A, red light 1210, blue light 1220, and green light 1215 are incident on a red mosaic 1245 of a Bayer filter. Red light passes from the red mosaic 1245 to the detector array 1205. Ideally only those portions or pixels of a detector array 1205 below the red mosaics 1210 register when red light is incident on the red mosaic resulting in a red Bayer pattern 1225. Similarly, as shown in FIGS. 12B and 12C, green light 1215 and blue light 1220 incident on green and blue mosaics 1250, 1255 produce green and red Bayer patterns 1225. Of course, in a non-ideal situation there may be some cross talk between pixels in the array. That is, red light may also trigger pixels under the green and/or blue mosaics and vice versa. As seen from the color response curve for a typical Bayer filter array shown in FIG. 13, there may be some overlap in the spectral ranges of the red 1315, green 1310, and blue 1305 transmission characteristics of the filter elements.

Figure 14:
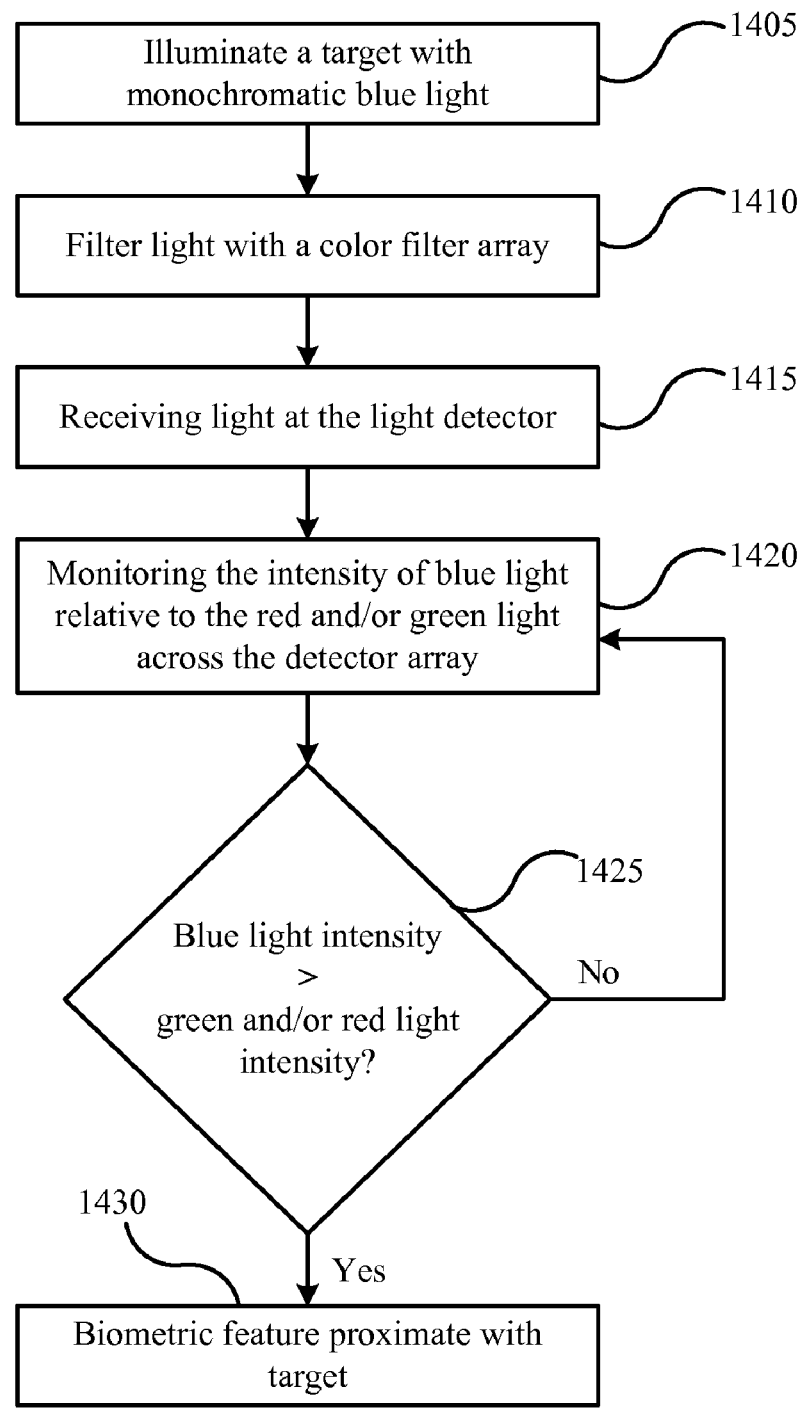
FIG. 14 shows a flowchart depicting an embodiment of the invention for determining the proximity of a biometric feature to a target.

FIG. 14 shows a flowchart depicting an embodiment of the invention for determining the proximity of a biometric feature to a target. A target is illuminated with a monochromatic light source at block 1405. The light source may illuminate the target and/or target area with a large angle of incidence, for example, greater than 60° from the normal of the surface of the target. The light source, in various embodiments, may be a monochromatic blue light source or, in another embodiment, the light source may emit monochromatic light less than about 600 nm. The light source or sources illuminate not only the target but also the area immediately above the target from beneath the target. A color filter array filters light from the target area at block 1410 prior to the light being incident on a light detector at block 1415. The color filter array may be any color filter array described in the various embodiments described herein. The color filter array filters light according to wavelength bands. Thus, the relative intensity of a wavelength band may be compared with other wavelength bands. As a purported biometric feature approaches the target, monochromatic light is reflected from the surface of the biometric feature. Accordingly, the relative intensity of the wavelength band containing the wavelength of the monochromatic light increases relative to other frequency bands as the purported biometric feature approaches the target.

Accordingly, in the embodiment shown in the flowchart, the intensity of blue light is monitored relative to the intensity of red and/or green light at block 1420. The method then determines if the intensity of blue light relative to the intensity of red and/or green light increases at block 1425. If the blue light intensity increases, then a purported biometric feature is proximate to the target at block 1430. If the blue light intensity does not increase enough, than there is no purported biometric feature proximate to the target and the system continues to monitor the intensity levels of various wavelength bands.

Figure 15:
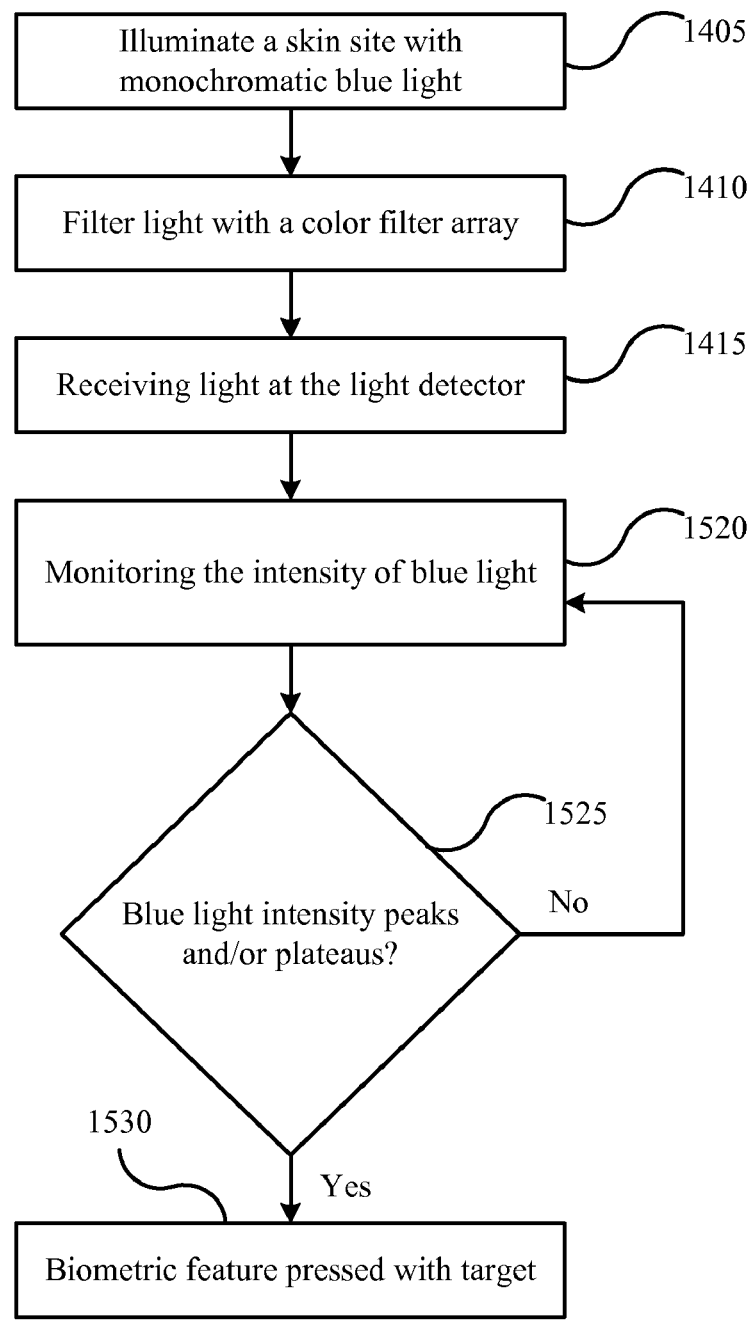
FIG. 15 shows a flowchart depicting an embodiment of the invention for determining whether a biometric feature is pressed with the surface of a target.

FIG. 15 shows a flowchart depicting an embodiment of the invention for determining whether a biometric feature is pressed with the surface of a target. Blocks 1405, 1410, 1415 are similar to those shown in FIG. 14. At block 1520, the blue light intensity is monitored. When a biometric feature, such as a finger, is pressed against surface, the blood is forced from the general area of contact. Blood absorbs blue light. Therefore, as blood is forced from the area of contact, blue light absorption decreases and blue light reflectivity increases at the area of contact. Accordingly, at a light detector, the intensity of blue light may increase as the blood is forced from the area of contact. Once contact has been initiated and maintained the intensity of blue light may plateau. Accordingly, at block 1525, the intensity of blue light is monitored to check if it has peaked and/or plateaued. If the intensity of blue light does not peak and/or plateau, then the system continues to monitor the blue light intensity levels at block 1520. If the intensity of blue light has peaked and/or plateaued, then a purported biometric feature has been pressed with the target surface at block 1530. Such embodiments may also be used to determine whether a purported biometric feature is or is not a non-biological counterfeit.

While blue light is used to describe this embodiment, other wavelengths may be used without deviating from the scope and/or spirit of the invention. For instance, other wavelengths of light may be used to determine whether a biometric feature is pressed against a target surface forcing blood from the area of contact.

Figure 16:
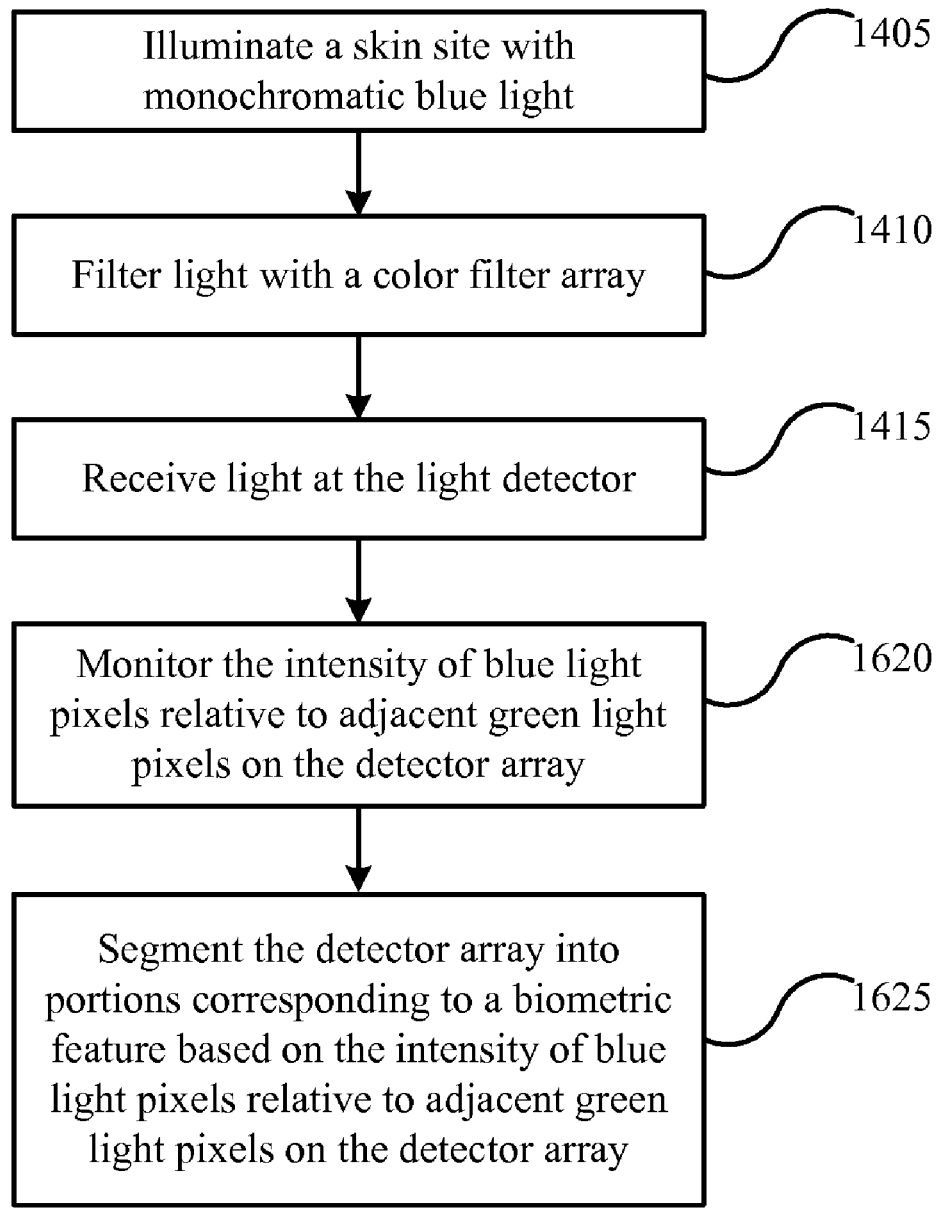
FIG. 16 shows a flowchart depicting an embodiment of the invention for segmenting the portions of an image associated with a biometric feature from background features.

FIG. 16 shows a flowchart depicting an embodiment of the invention for segmenting the portions of an image associated with a biometric feature from background features. Blocks 1405, 1410, 1415 are similar to those shown in FIG. 14. At block 1620, the intensity of blue light pixels are compared with the intensity of adjacent green light pixels. Areas where the intensity of blue light is high relative to the intensity of the green light correspond to areas where a biometric feature is located on an image from purported biometric feature at a target surface. In one embodiment, such a determination can be made on a pixel-by-pixel basis. In another embodiment, such a determination can be made based on groups of pixels. Any of various mathematical functions may be used to compare the two intensity levels. For example, the ratio of the blue light intensity versus the adjacent green light intensities may be calculated. As another example, the difference of the two intensities may be calculated. In yet another embodiment of the invention various other wavelength bands may be used besides blue and green to make a segmentation determination. Moreover, these bands may be determined based on the type of color filter array used.

Figure 17:
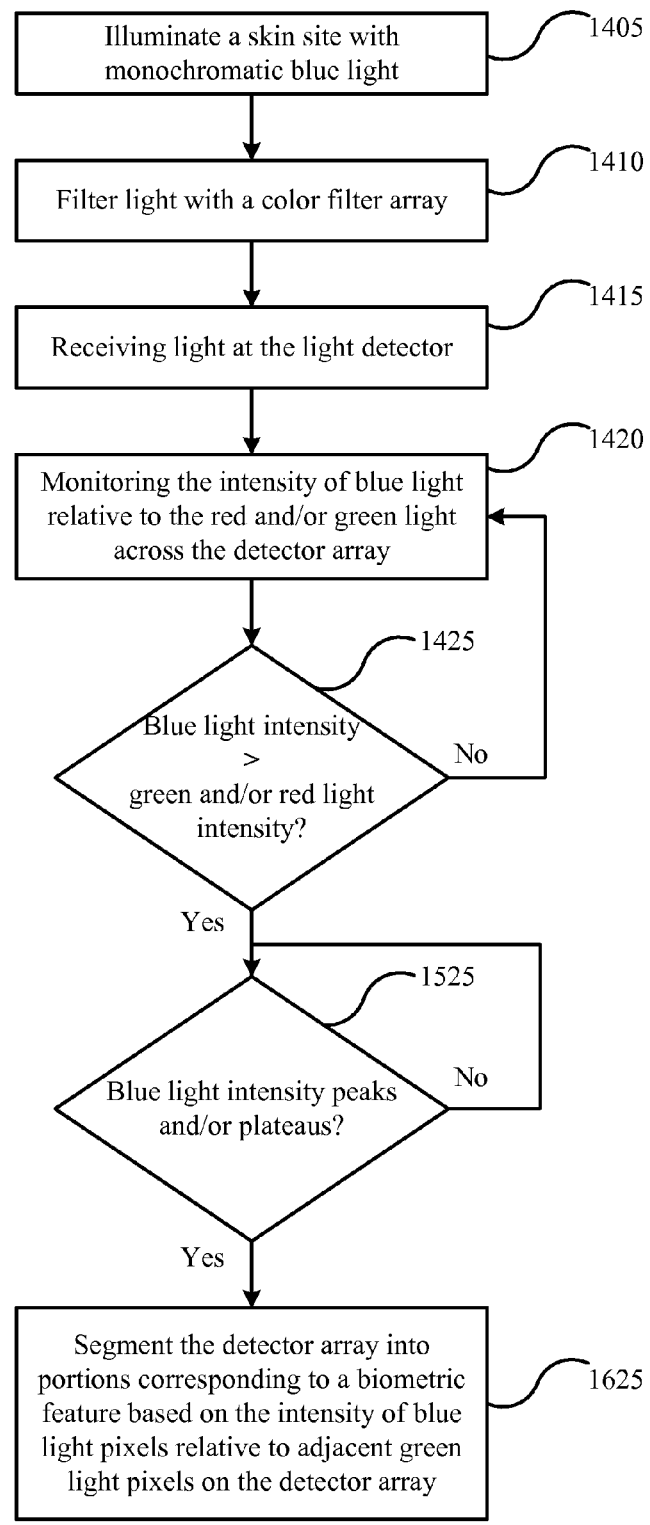
FIG. 17 shows a flowchart combining the embodiments shown in FIGS. 14-16 according to another embodiment.

FIG. 17 shows a flowchart combining the embodiments shown in FIGS. 14-16 according to another embodiment. According to this embodiment, blocks 1405, 1410, 1415, 1420 are similar to those shown in FIG. 14. That is, the target is illuminated with monochromatic blue light 1405, light is filtered at a color filter array 1410, and then detected at the light detector 1415. The intensity of blue light relative to the red and/or green light is monitored across the detector array at block 1420. Similar variations discussed in previous embodiments may be applied in association with flowchart shown in FIG. 17. If the blue light intensity is not sufficiently greater than the green and/or red light intensities as determined at block 1425, then the system continues to monitor these intensities at block 1420. In some embodiments, a threshold value may be used to see if the blue light intensity is sufficiently greater than the red or green light intensities. If the blue light intensity is sufficiently greater than the red and/or green light intensities, then a purported biometric feature is within the proximity of the target.

The system may then monitor the blue light intensity to see if it peaks or plateaus at block 1525 according to one embodiment. If it does, then the biometric feature has made contact with the target. If it does not, then the system continues to monitor the blue light intensity. Once the biometric feature has made contact with the target surface, the system may then segment the portions of the detector array corresponding to the biometric feature from the portion of the detector array corresponding to background features by mathematically comparing the intensity of blue light pixels with the intensity of adjacent green light pixels at block 1625. The various other embodiments described in association with FIGS. 14-16 may also be applied to this embodiment of the invention.

Figure 18A:
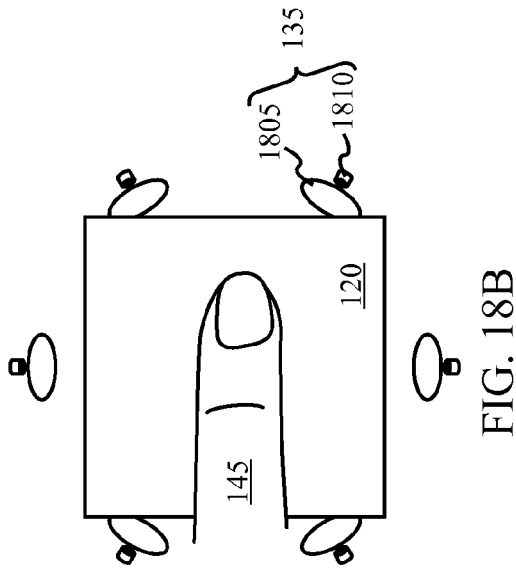
FIG. 18A-18D shows a system for performing proximity, presence and/or segmentation of a biometric feature according to one embodiment.
Figure 18B:
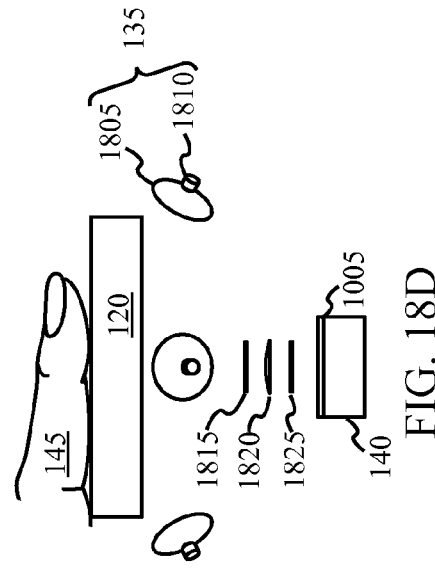
Figure 18C:
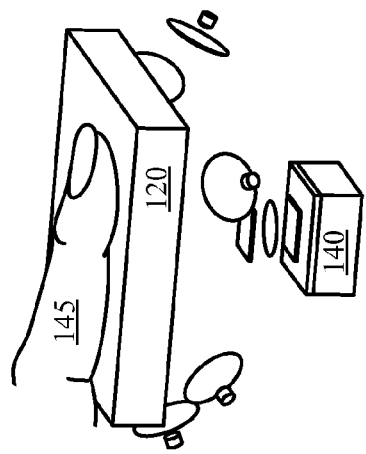
Figure 18D:
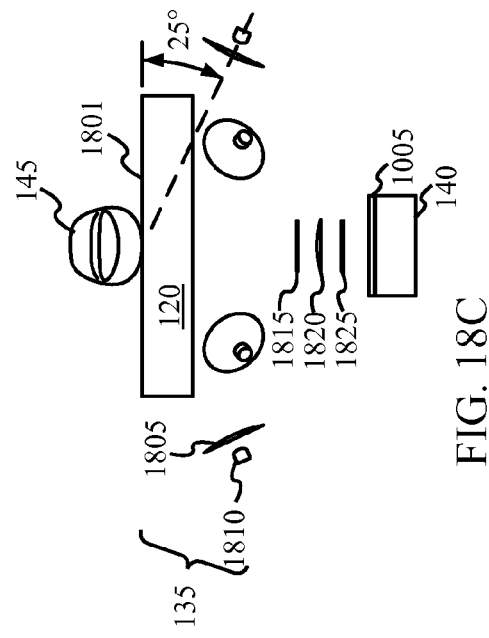

FIGS. 18A-18D show various views of a system for performing proximity, presence and/or segmentation of a biometric feature according to one embodiment. FIG. 18A shows a perspective view of the system. FIG. 18B shows a top view and FIGS. 18C and 18D show side views. A target 117 is shown with a human finger 145 placed thereon for biometric detection. The system, according to this embodiment, includes six illumination sources 135 arrayed around the center of the target. In other embodiments of the invention, various other numbers of illumination sources may be used. For example, 2, 3, 4, 5, 7, 8, 9, or 10 illumination sources may be used. Each illumination source 135 may include various optical elements 1805 such as lenses as well as a monochromatic light source 1810. In one embodiment, the light source 1810 includes an LED. As shown in FIG. 18C, the illumination sources 135 are positioned such that they produce light that is incident on the target at a small angle relative to the target surface. This angle may be less than about 30°. In some embodiments, the angle is between about 20° and 25°. The system also includes a detector 140 with a color array filter 1005. The optical system also includes a number of optional optical elements 1815, 1820, 1825 above the detector 140.

What is claimed is:

1. A biometric feature detection system comprising:
    a target including a target surface configured to receive a biometric feature at the target surface;
    an illumination source configured to illuminate at least a portion of a target surface from below the target surface with monochromatic blue light at a large angle of incidence measured from the normal of the target surface;
    a color filter array comprising a plurality of color mosaics arrayed across the color filter array;
    a light detector configured to receive light from the target through the color-filter array and provide an image of the target surface, wherein each pixel of the light detector corresponds to one of the plurality of color mosaics such that each pixel detects light associated with corresponding color filter; and
    a computational unit interfaced with the light detector, wherein the computation unit includes instructions to monitor the levels of blue light and compute a mathematical function on the levels of blue light in proportion with levels of other light.

2. The biometric feature detection system according to claim 1, wherein the color filter array comprises a Bayer filter.

3. The biometric feature detection system according to claim 1, wherein the mathematical function determines whether a potential biometric feature is near the surface target based on the intensity of the blue light received at the light detector relative to the intensity of light other than the blue light.

4. The biometric feature detection system according to claim 1, wherein the mathematical function identifies when the purported biometric feature is placed on the target surface by determining when the intensity of blue light received at the light detector increases due to blood loss in portions of the purported biometric feature.

5. The biometric feature detection system according to claim 1, wherein the mathematical function segments portions of the image corresponding to a purported biometric feature from portions of the image corresponding to the background by comparing the levels of a wavelength band corresponding to blue light with the levels of another wavelength band.

6. A method for detecting the proximity of a potential biometric feature to a target, the method comprising:
    illuminating at least a portion of the target surface and a portion of the area above the target surface from below the target surface with monochromatic light at a large angle of incidence measured from normal of the target surface;
    receiving light at a light detector, wherein the light received at the light detector includes ambient light from above the target surface; and
    determining whether a potential biometric feature is near the surface target based on the intensity of the monochromatic light received at the light detector relative to the intensity of light other than the monochromatic light received at the light detector.

7. The method according to claim 6, further comprising monitoring the relative intensity of the monochromatic light relative to the intensity of light other than the monochromatic light.

8. The method according to claim 6, wherein the large angle comprises an angle greater than or equal to about 60°.

9. The method according to claim 6, wherein the monochromatic light comprises blue light, and the light other than the monochromatic light comprises red light.

10. The method according to claim 6, wherein the monochromatic light comprises blue light, and the light other than the monochromatic light comprises green light.

11. The method according to claim 6, wherein the monochromatic light comprises light with a wavelength less than 600 nm.

12. The method according to claim 6, wherein the monochromatic light is illuminated from a plurality of light sources arranged radially about the target.

13. The method according to claim 6, wherein the light received at the light detector includes light reflected from a potential biometric feature in the proximity of the target.

14. The method according to claim 6, further comprising filtering light into a plurality of wavelength bands prior to receiving light at the light detector.

15. A biometric proximity detector, comprising:
a target including a target surface adapted to receive a potential biometric feature;
at least one monochromatic light source configured to illuminate at least a portion of the target surface and a portion of the area above the target surface from below the target surface with monochromatic light at a large angle of incidence measured from normal of the target surface;
a light detector configured to receive light from the target surface and a portion of the area above the target surface, wherein the light received at the light detector includes ambient light from above the target; and
means for determining whether a potential biometric feature is near the surface target based on the intensity of the monochromatic light received at the light detector relative to the intensity of light other than the monochromatic light received at the light detector.

16. The biometric proximity detector according to claim 15, further comprising a color filter array, wherein the color filter array filters light into spectral bands before the light is received at the light detector.

17. The biometric proximity detector according to claim 16, wherein the color filter array filters light into red, blue and green spectral bands.

18. The biometric proximity detector according to claim 15, further comprising a Bayer filter that filters light into a pattern of red, green and blue light.

19. The biometric proximity detector according to claim 15, wherein the monochromatic light is blue light.

20. The biometric proximity detector according to claim 15, wherein the at least one monochromatic light source comprises at least four monochromatic light sources arranged radially about the surface target.

21. The biometric proximity detector according to claim 15, wherein the large angle comprises an angle greater than or equal to about 60°.

22. The biometric proximity detector according to claim 15, wherein the light source comprises an LED.

23. A method for identifying when a purported biometric feature is placed on a target surface, the method comprising:
illuminating at least a portion of the target surface and a portion of the area above the target surface from below the target surface with monochromatic light, wherein the monochromatic light is absorbed by blood;
receiving light at a light detector, wherein the light received at the light detector includes monochromatic light reflected from the purported biometric feature at or near the target surface;
monitoring the intensity of the monochromatic light received at the light detector; and
identifying when the purported biometric feature is placed on the target surface by determining when the intensity of monochromatic light received at the light detector increases due to blood loss in portions of the purported biometric feature.

24. The method according to claim 23, wherein the monochromatic light comprises blue light.

25. The method according to claim 23, wherein the monochromatic light comprises light with a wavelength less than about 600 nm.

26. A biometric feature presence detector comprising:
a target including a target surface adapted to receive a potential biometric feature;
a monochromatic light source disposed below the target surface, wherein the monochromatic light source illuminates at least a portion of the target surface and a portion of the area above the target surface with monochromatic light;
a light detector disposed below the target surface and configured to receive light from the target surface and a portion of the area above the target surface; and
a computational unit interfaced with the light detector and having:
instructions to monitor the intensity of monochromatic light received at the light detector; and
instructions to identify when the purported biometric feature is placed on the target surface by determining when the intensity of monochromatic light received at the light detector increases due to blood loss in portions of the purported biometric feature.

27. The biometric feature presence detector according to claim 26, wherein the monochromatic light comprises light with a wavelength less than or equal to about 600 nm.

28. A biometric feature presence detector comprising:
a target including a target surface adapted to receive a potential biometric feature;
means for illuminating at least a portion of the target surface and a portion of the area above the target surface with monochromatic light originating from below the target surface;
a light detector configured to receive light from the target surface and a portion of the area above the target surface; and
means for identifying when the purported biometric feature is placed on the target surface by determining when the intensity of monochromatic light received at the light detector increases due to blood loss in portions of the purported biometric feature.

29. The biometric feature presence detector according to claim 28, wherein the monochromatic light comprises light with a wavelength less than or equal to about 600 nm.

30. A method for segmenting a biometric feature from the background, the method comprising:
illuminating the biometric feature with monochromatic light;
filtering light reflected from the biometric feature and ambient light with a color filter array into a plurality of wavelength bands, wherein one of said plurality of wavelength bands corresponds with the wavelength of the monochromatic light illuminating the biometric feature;

detecting light reflected from the biometric feature and ambient light filtered by the color filter array, wherein each pixel of the detector receives light corresponding to a wavelength band and providing an image of the target;

comparing pixels corresponding with the wavelength of the monochromatic light;

segmenting portions of the image corresponding to a purported biometric feature from portions of the image corresponding to the background by comparing the levels of a wavelength band corresponding to the monochromatic light with the levels of another wavelength band.

31. The method according to claim 30, wherein the monochromatic light comprises blue light and the another wavelength band comprises green light.

32. A biometric feature presence detector comprising:

a target including a target surface adapted to receive a potential biometric feature;

a monochromatic light source disposed below the target surface, wherein the monochromatic light source illuminates at least a portion of the target surface and a portion of the area above the target surface with monochromatic light;

a color filter array;

a light detector disposed below the color filter array and the target surface, and configured to receive light from the target surface and ambient light from an area above the target surface through the color filter array; and a computational unit interfaced with the light detector and having:

instructions to segment portions of the image corresponding to a purported biometric feature from portions of the image corresponding to the background by comparing the levels of a wavelength band corresponding to monochromatic light with the levels of another wavelength band.

* * * * *